United States Patent
Nelson et al.

(10) Patent No.: US 7,625,419 B2
(45) Date of Patent: Dec. 1, 2009

(54) AIR FILTER ARRANGEMENT; ASSEMBLY; AND, METHODS

(75) Inventors: Benny Kevin Nelson, Bloomington, MN (US); Gregory L. Reichter, Bloomington, MN (US); Bruce Allen Boehrs, Blaine, MN (US); Paul Anthony Wendt, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 316 days.

(21) Appl. No.: 11/651,751

(22) Filed: Jan. 10, 2007

(65) Prior Publication Data

US 2007/0261374 A1 Nov. 15, 2007

Related U.S. Application Data

(60) Provisional application No. 60/799,459, filed on May 10, 2006.

(51) Int. Cl.
*B01D 46/52* (2006.01)

(52) U.S. Cl. .......................... 55/521; 55/357; 55/385.3; 55/484; 55/502; 55/503; 55/529

(58) Field of Classification Search ................ 55/385.3, 55/483, 484, 497, 500, 502, 503, 504, 521, 55/529, DIG. 5, 357
See application file for complete search history.

(56) References Cited

U.S. PATENT DOCUMENTS

| 2,093,877 | A | 9/1937 | Pentz |
| 2,270,969 | A | 1/1942 | Robinson |
| 2,306,325 | A | 12/1942 | Allam |
| 2,915,188 | A | 12/1959 | Buker |
| 2,955,028 | A | 10/1960 | Bevans |
| 3,025,963 | A | 3/1962 | Bauer |
| 3,224,592 | A | 12/1965 | Burns et al. |
| 3,494,113 | A | 2/1970 | Kinney |
| 3,598,738 | A | 8/1971 | Biswell et al. |
| 3,645,402 | A | 2/1972 | Alexander et al. |
| 3,687,849 | A | 8/1972 | Abbott |
| 3,749,247 | A | 7/1973 | Rohde |
| 4,014,794 | A | 3/1977 | Lewis |
| 4,061,572 | A | 12/1977 | Cohen et al. |
| 4,066,559 | A | 1/1978 | Rohde |
| 4,075,097 | A | 2/1978 | Paul |

(Continued)

FOREIGN PATENT DOCUMENTS

DE 88 08 632 9/1988

(Continued)

OTHER PUBLICATIONS

Exhibit A-Design Patent Application corresponding to U.S. Appl. No. 29/259,594.

*Primary Examiner*—Duane Smith
*Assistant Examiner*—Robert A Clemente
(74) *Attorney, Agent, or Firm*—Merchant & Gould P.C.

(57) ABSTRACT

An air filter arrangement, an air cleaner assembly including the air filter arrangement and methods of assembly and use are described. An air filter arrangement comprising a serviceable filter cartridge is described. The typical cartridge includes a recessed first flow face and an opposite outwardly projecting second flow face, with a central apex. Features of the cartridge, and an air cleaner for installation into the cartridge, are described.

39 Claims, 36 Drawing Sheets

U.S. PATENT DOCUMENTS

| | | | |
|---|---|---|---|
| 4,075,098 A | 2/1978 | Paul et al. |
| 4,080,185 A | 3/1978 | Richter et al. |
| 4,144,166 A | 3/1979 | Dejovine |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,452,616 A | 6/1984 | Gillingham et al. |
| 4,589,983 A | 5/1986 | Wydeven |
| 4,600,420 A | 7/1986 | Wydeven et al. |
| 4,738,776 A | 4/1988 | Brown |
| 4,755,289 A | 7/1988 | Villani |
| 4,782,891 A | 11/1988 | Cheadle et al. |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,064,799 A | 11/1991 | Monte et al. |
| 5,069,799 A | 12/1991 | Brownawell et al. |
| 5,094,745 A | 3/1992 | Reynolds |
| 5,213,596 A | 5/1993 | Kume et al. |
| 5,222,488 A | 6/1993 | Forsgren et al. |
| 5,223,011 A | 6/1993 | Hanni |
| 5,225,081 A | 7/1993 | Brownawell et al. |
| 5,258,118 A | 11/1993 | Gouritin et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,463 A * | 12/1995 | Herman et al. ................ 55/319 |
| 5,494,497 A | 2/1996 | Lee |
| 5,498,332 A | 3/1996 | Handtmann |
| 5,512,074 A | 4/1996 | Hanni et al. |
| 5,541,330 A | 7/1996 | Wear et al. |
| 5,556,542 A | 9/1996 | Berman et al. |
| 5,562,825 A | 10/1996 | Yamada et al. |
| 5,575,826 A | 11/1996 | Gillingham et al. |
| 5,591,330 A | 1/1997 | Lefebvre |
| 5,643,541 A | 7/1997 | Peddicord et al. |
| 5,662,799 A | 9/1997 | Hudgens et al. |
| 5,718,258 A | 2/1998 | Lefebvre et al. |
| 5,738,785 A | 4/1998 | Brown et al. |
| 5,753,116 A | 5/1998 | Baumann et al. |
| 5,759,217 A | 6/1998 | Joy |
| 5,772,873 A | 6/1998 | Hudgens et al. |
| 5,772,883 A | 6/1998 | Rothman et al. |
| D396,098 S * | 7/1998 | Gillingham et al. ........ D23/365 |
| 5,792,247 A * | 8/1998 | Gillingham et al. ........... 96/386 |
| 5,795,361 A | 8/1998 | Lanier, Jr. et al. |
| 5,803,024 A | 9/1998 | Brown |
| 5,820,646 A | 10/1998 | Gillingham et al. |
| 5,891,402 A | 4/1999 | Sassa et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham |
| 6,086,763 A | 7/2000 | Baumann |
| 6,098,575 A | 8/2000 | Mulshine et al. |
| 6,129,852 A | 10/2000 | Elliot et al. |
| 6,149,700 A | 11/2000 | Morgan et al. |
| 6,165,519 A | 12/2000 | Lehrer et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,210,469 B1 * | 4/2001 | Tokar ........................... 95/287 |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,306,193 B1 | 10/2001 | Morgan et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 5,517,598 A1 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,018,531 B2 | 3/2006 | Eilers et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,258,719 B2 | 8/2007 | Miller et al. |
| 7,282,075 B2 * | 10/2007 | Sporre et al. .................. 55/302 |
| 7,338,544 B2 * | 3/2008 | Sporre et al. .................. 55/302 |
| 2001/0032545 A1 | 10/2001 | Goto et al. |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0218150 A1 | 11/2003 | Blakemore et al. |
| 2004/0035097 A1 | 2/2004 | Schlensker et al. |
| 2004/0060861 A1 | 4/2004 | Winter et al. |
| 2004/0091654 A1 | 5/2004 | Kelly et al. |
| 2004/0140255 A1 | 7/2004 | Merritt et al. |
| 2004/0187689 A1 | 9/2004 | Sporre et al. |
| 2004/0221555 A1 | 11/2004 | Engelland et al. |

| | | |
|---|---|---|
| 2004/0226443 A1 | 11/2004 | Gillingham et al. |
| 2005/0019236 A1 | 1/2005 | Martin et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0180537 A1 | 8/2006 | Loftis et al. |
| 2008/0307759 A1 | 12/2008 | Reichter et al. |
| 2009/0064646 A1 | 3/2009 | Reichter et al. |

FOREIGN PATENT DOCUMENTS

| | | |
|---|---|---|
| DE | 296 13 098 | 10/1996 |
| EP | 1 166 843 | 1/2002 |
| EP | 1 233 173 A2 | 8/2002 |
| FR | 2 214 505 A | 8/1974 |
| GB | 970826 | 11/1964 |
| GB | 2 082 932 A | 3/1982 |
| JP | 60-112320 | 7/1985 |
| JP | 1-171615 | 12/1987 |
| JP | 1-163408 | 11/1989 |
| JP | 2-25009 | 2/1990 |
| WO | WO 97/40908 | 11/1997 |
| WO | WO 98/12430 | 3/1998 |
| WO | WO 01/97946 A1 | 12/2001 |
| WO | WO 02/092193 | 11/2002 |
| WO | WO 03/095068 | 11/2003 |
| WO | WO 2004/052504 A2 | 6/2004 |
| WO | WO 2004/054684 A1 | 7/2004 |
| WO | WO 2005/046841 | 5/2005 |
| WO | WO 2005/058461 A1 | 6/2005 |
| WO | WO 2005/063358 A2 | 7/2005 |
| WO | WO 2005/077487 | 8/2005 |
| WO | WO 2005/079954 A1 | 9/2005 |
| WO | WO 2005/115581 | 12/2005 |
| WO | WO 2005/123214 A1 | 12/2005 |
| WO | WO 2005/123222 | 12/2005 |
| WO | WO 2005/123222 A1 | 12/2005 |
| WO | WO 2006/012386 A2 | 2/2006 |
| WO | WO 2006/017790 A1 | 2/2006 |
| WO | WO 2006/076456 | 4/2006 |
| WO | WO 2006/076479 | 7/2006 |
| WO | WO 2006/076479 A1 | 7/2006 |
| WO | WO 2007/009039 A1 | 1/2007 |
| WO | WO 2007/044677 | 4/2007 |

* cited by examiner

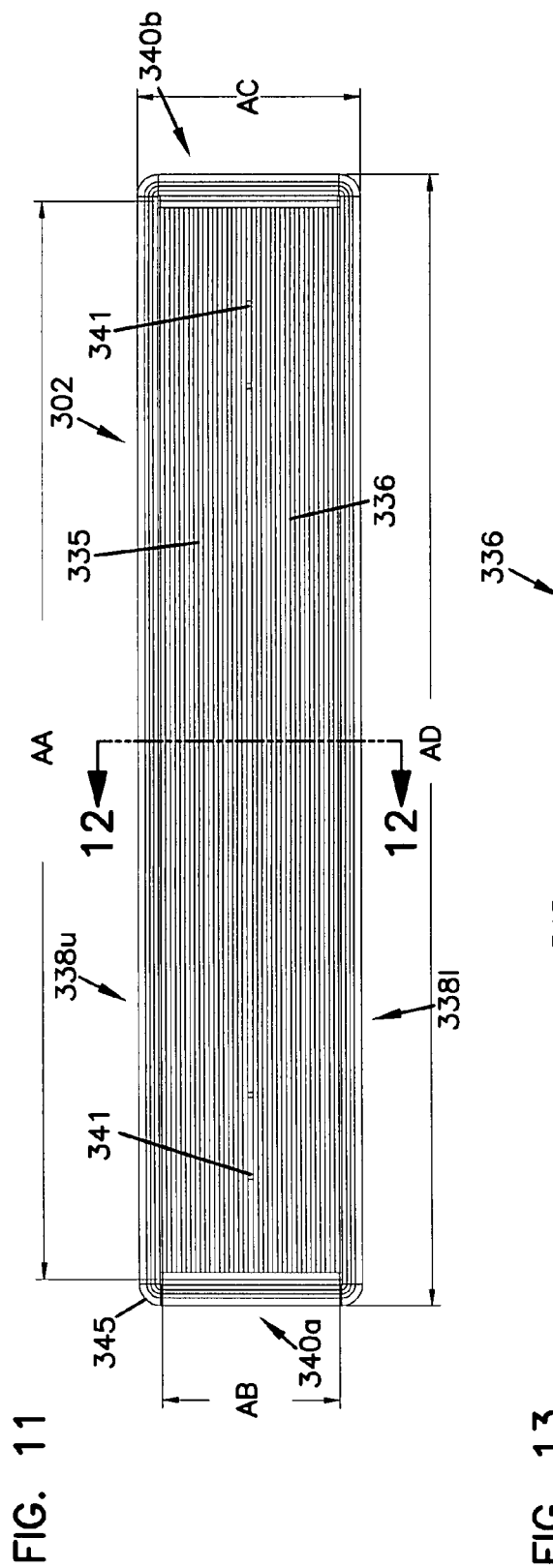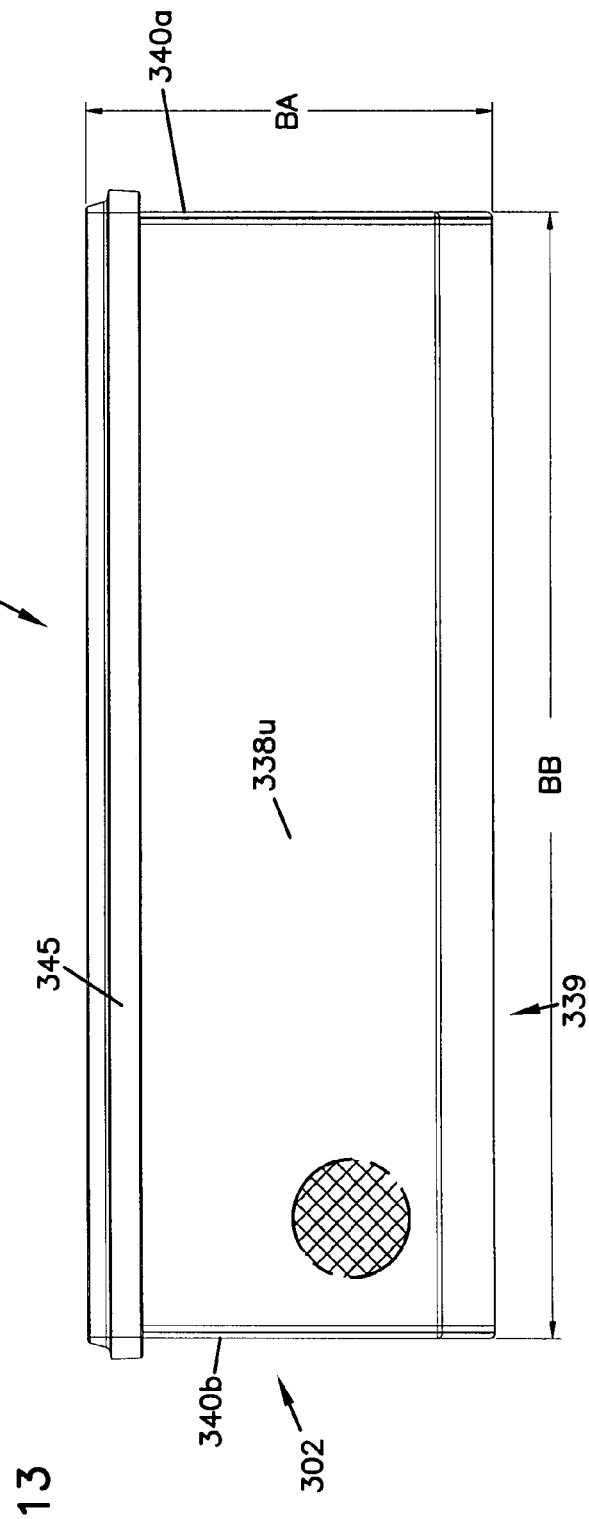

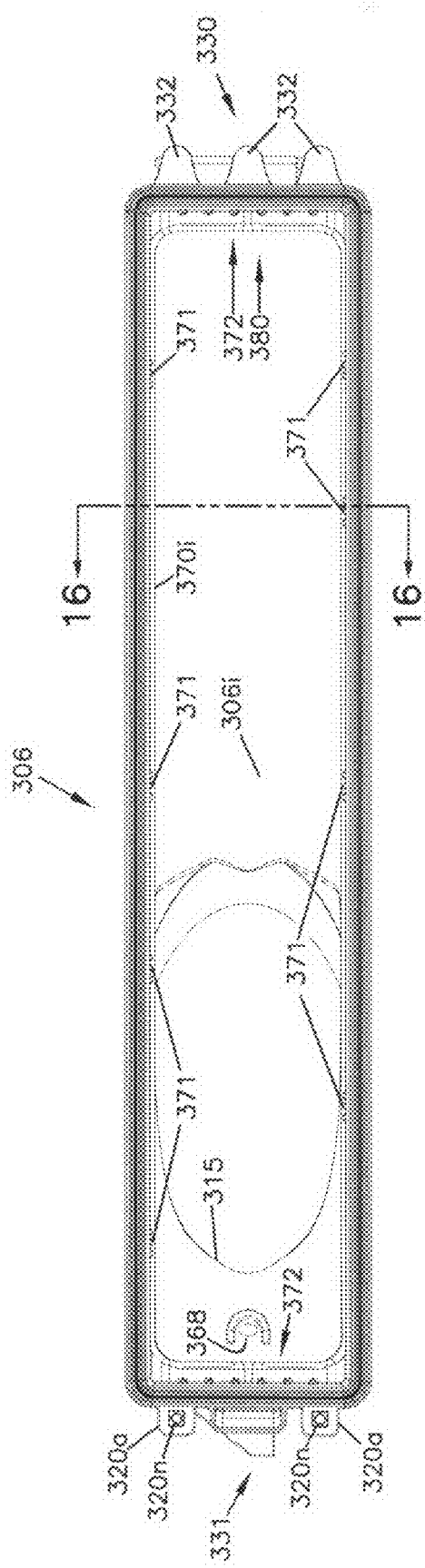

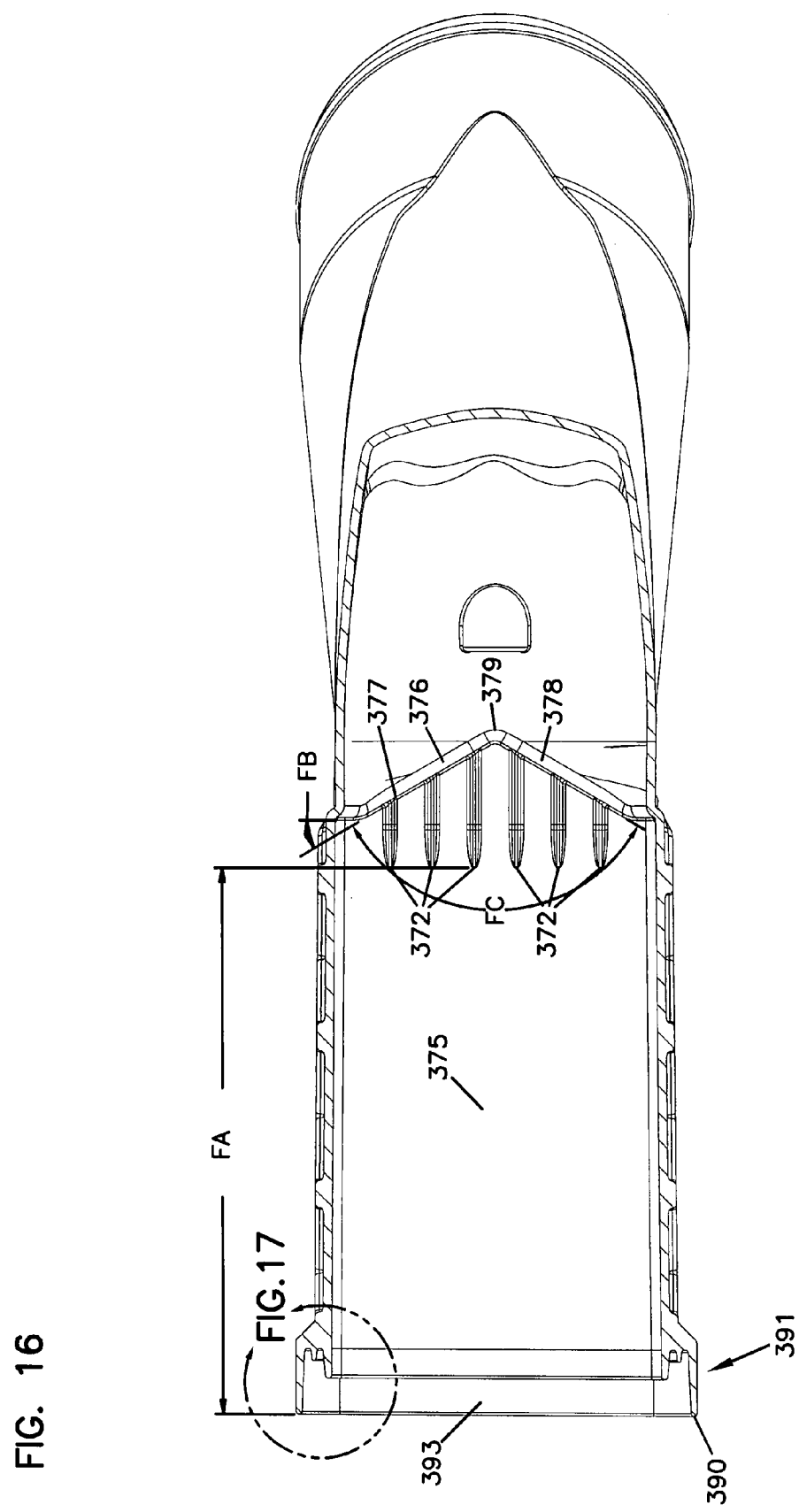

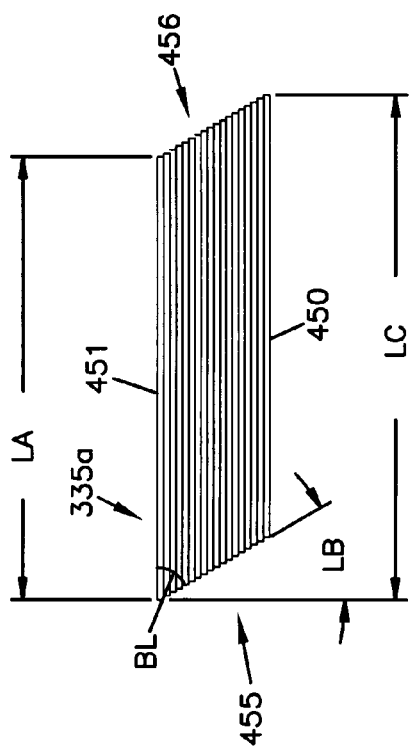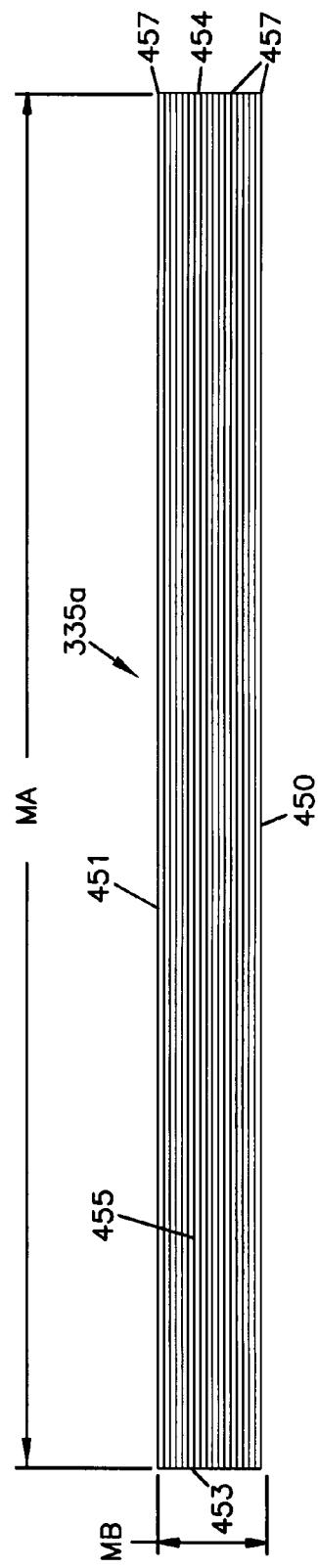
FIG. 24
FIG. 25

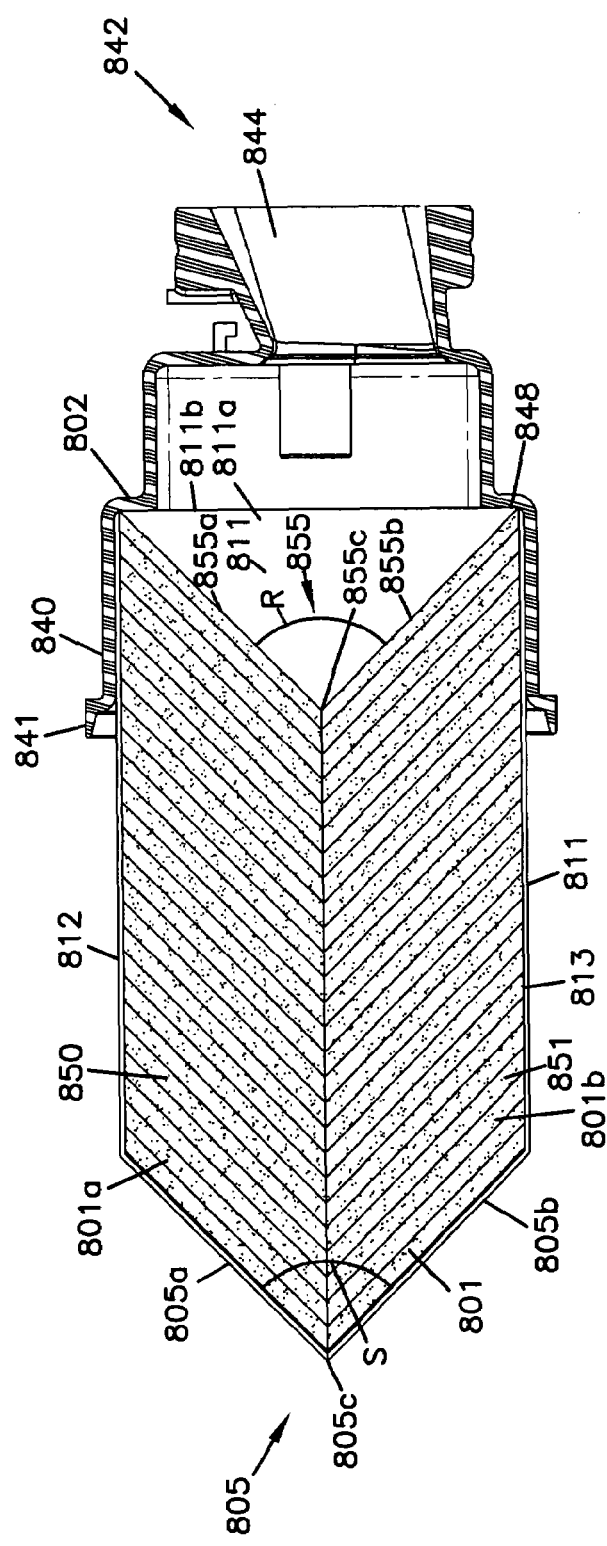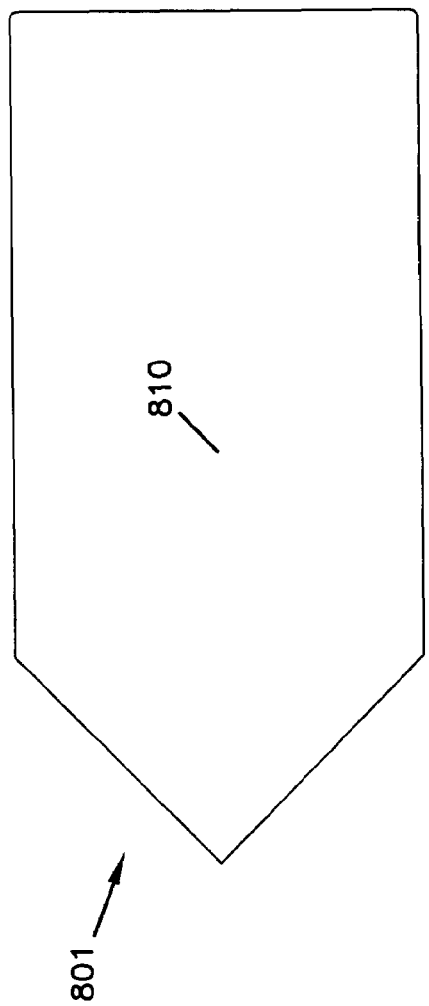
FIG. 41
FIG. 42

AIR FILTER ARRANGEMENT; ASSEMBLY; AND, METHODS

For this application, a claim of priority from provisional application Ser. No. 60/799,459, filed May 10, 2006 is made. Also, Ser. No. 60/799,459 is incorporated herein by reference in its entirety.

FIELD OF THE DISCLOSURE

The present disclosure relates to filter arrangements for use in filtering gases. The disclosure particularly relates to media packs that use z-filter media as characterized herein. Z-filter media generally comprises fluted media secured to facing media, formed into a media pack. More specifically, the disclosure relates to such media packs and their inclusion in serviceable air filter cartridge arrangements, typically for use in air cleaners. Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of fluid filter (air or liquid filter) arrangements have been developed for contaminant rejection. Improvements are sought.

SUMMARY

A variety of features and techniques useable in air cleaner assemblies, serviceable filter cartridges therefor and methods for assembly and operation are described. Several examples of air filter cartridges are characterized. There is no specific requirement that an air cleaner or component include all of the specific features characterized herein, to include advantages according to the techniques described.

In the example air filter cartridges provided media pack arrangements having a recessed flow face and a projecting opposite flow face are described, the media pack including a plurality of inlet flutes and outlet flutes as characterized. In examples shown, the media pack comprises media pack sections, oriented adjacent one another, for example positioned on opposite sides of a center piece. The center piece can further include a handle arrangement, for example projecting outwardly from a recess in the recessed flow face of the cartridge.

Various additional features including an advantageous housing seal arrangement, end piece arrangements and protective screen arrangements are described. In addition air cleaner assembly with features for securely supporting the filter cartridge are characterized.

Methods of assembly and use are also characterized.

Also, an alternate air cleaner assembly with a media pack adhesively secured to a pre-form, is described

BRIEF DESCRIPTION OF THE DRAWINGS

FIG. 11 is a schematic inlet, elevational view of the cartridge component of FIG. 10.

FIG. 13 is a schematic top plan view of the cartridge component of FIG. 10.

FIG. 15 is a side elevational view looking inside of the body/outlet section or component of the air cleaner of FIG. 7, with the serviceable filter cartridge of FIG. 10 removed.

FIG. 16 is a cross-sectional view taken along line 16-16, FIG. 15.

FIG. 24 is a schematic side elevational view of the media pack component of FIG. 23.

FIG. 25 is a schematic inlet face view of the component depicted in FIGS. 23 and 24.

FIG. 41 is a schematic cross-sectional view taken along line 41-41, FIG. 40.

FIG. 42 is a side elevational view of a media pack component within the assembly of FIG. 40.

DETAILED DESCRIPTION

I. Z-Filter Media Configurations, Generally

Figure 1:
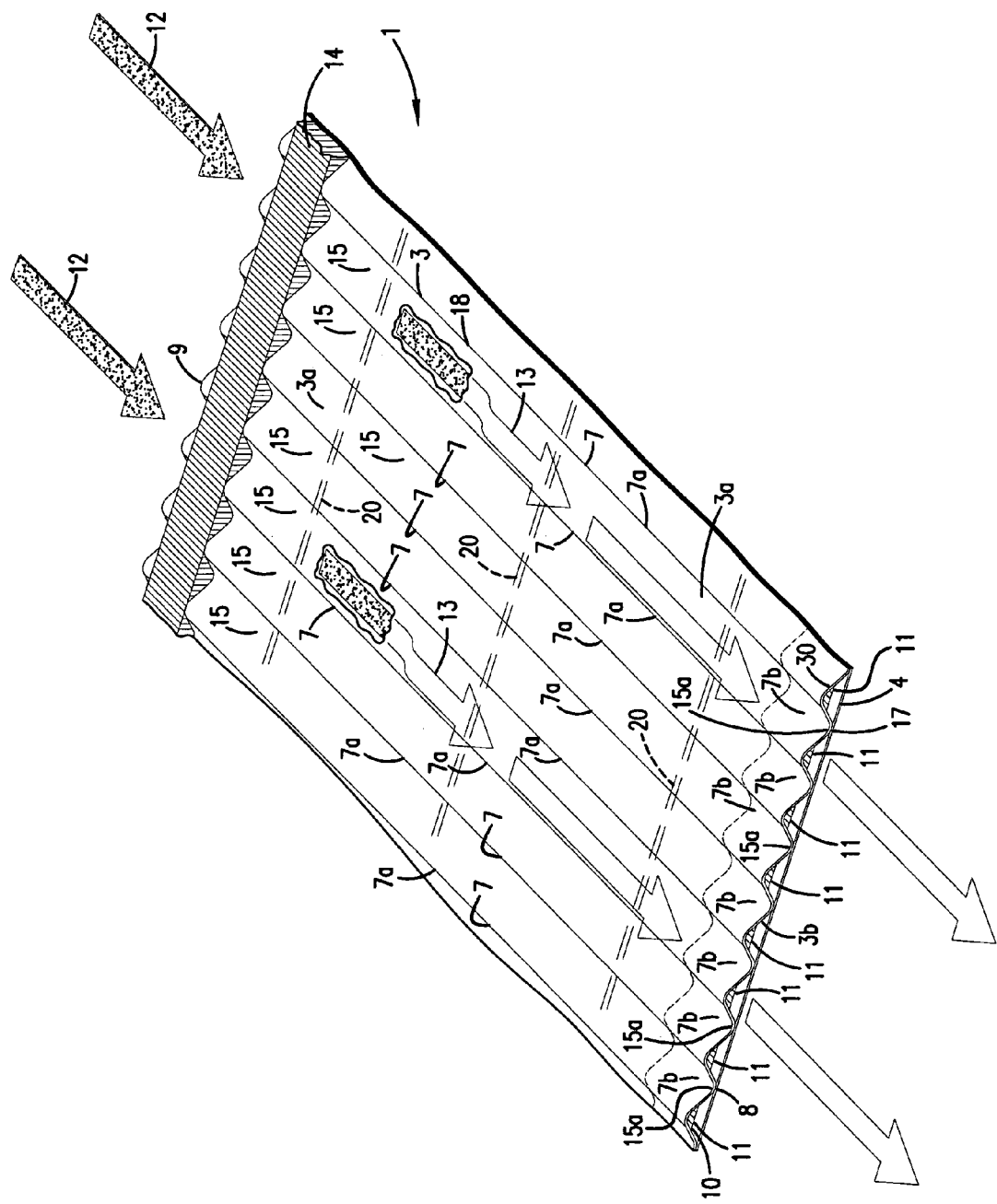
FIG. 1 is a fragmentary, schematic, perspective view of z-filter media useable in arrangements according to the present disclosure.

Fluted filter media can be used to provide fluid filter constructions in a variety of manners. One well known manner is characterized herein as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which is then assembled into stacks to form media packs, are sometimes referred to as "single facer strips". The term "single facer strip" and variants thereof, is meant to refer to a fact that one face, i.e., a single face, fluted (typically corrugated) sheet, is faced by the facing sheet, in the strip.

Typically, coiling of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a fluted, in this instance corrugated, sheet 3 and a facing sheet 4. A construction such as media 1 is deferred to herein as a single facer or single facer strip.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from media 1, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are critical to proper operation of the media structure that results. The high sealant volume and area, creates issues with respect to this.

Figure 2:
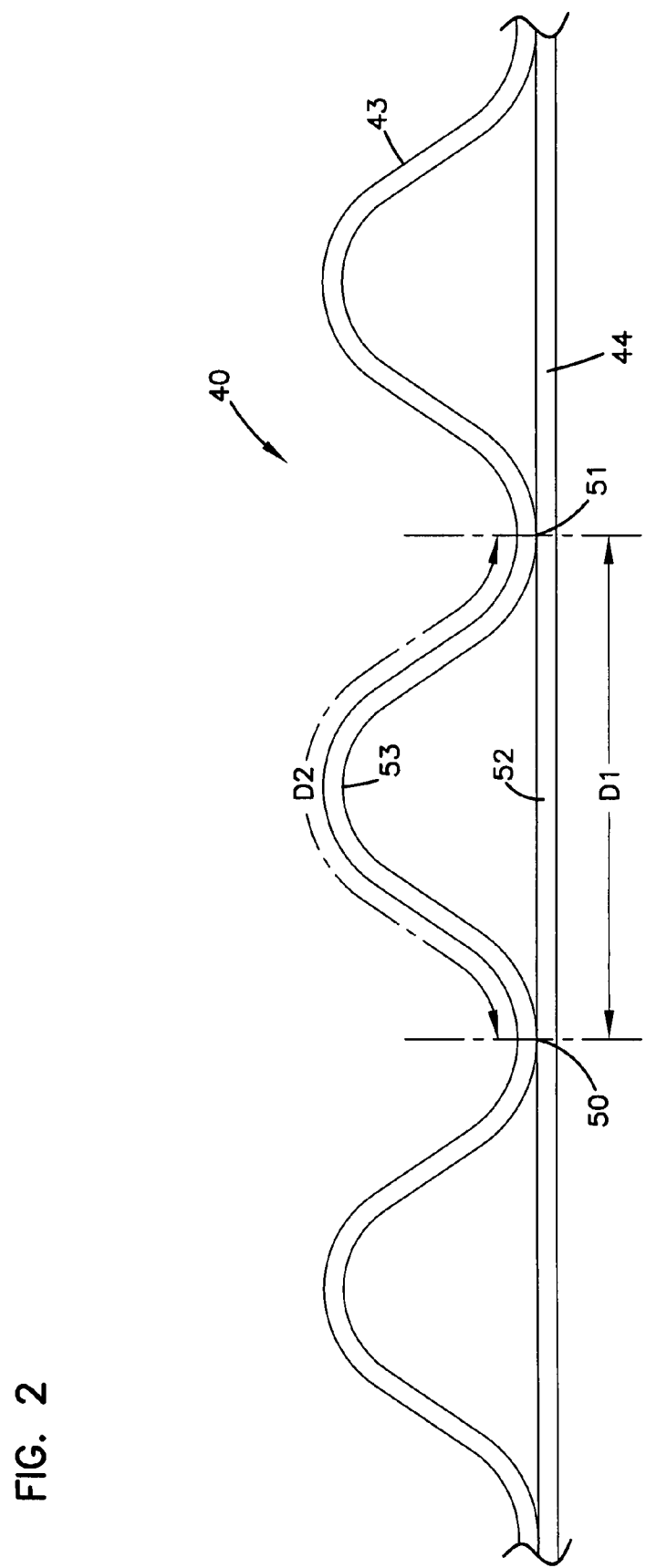
FIG. 2 is an enlarged schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
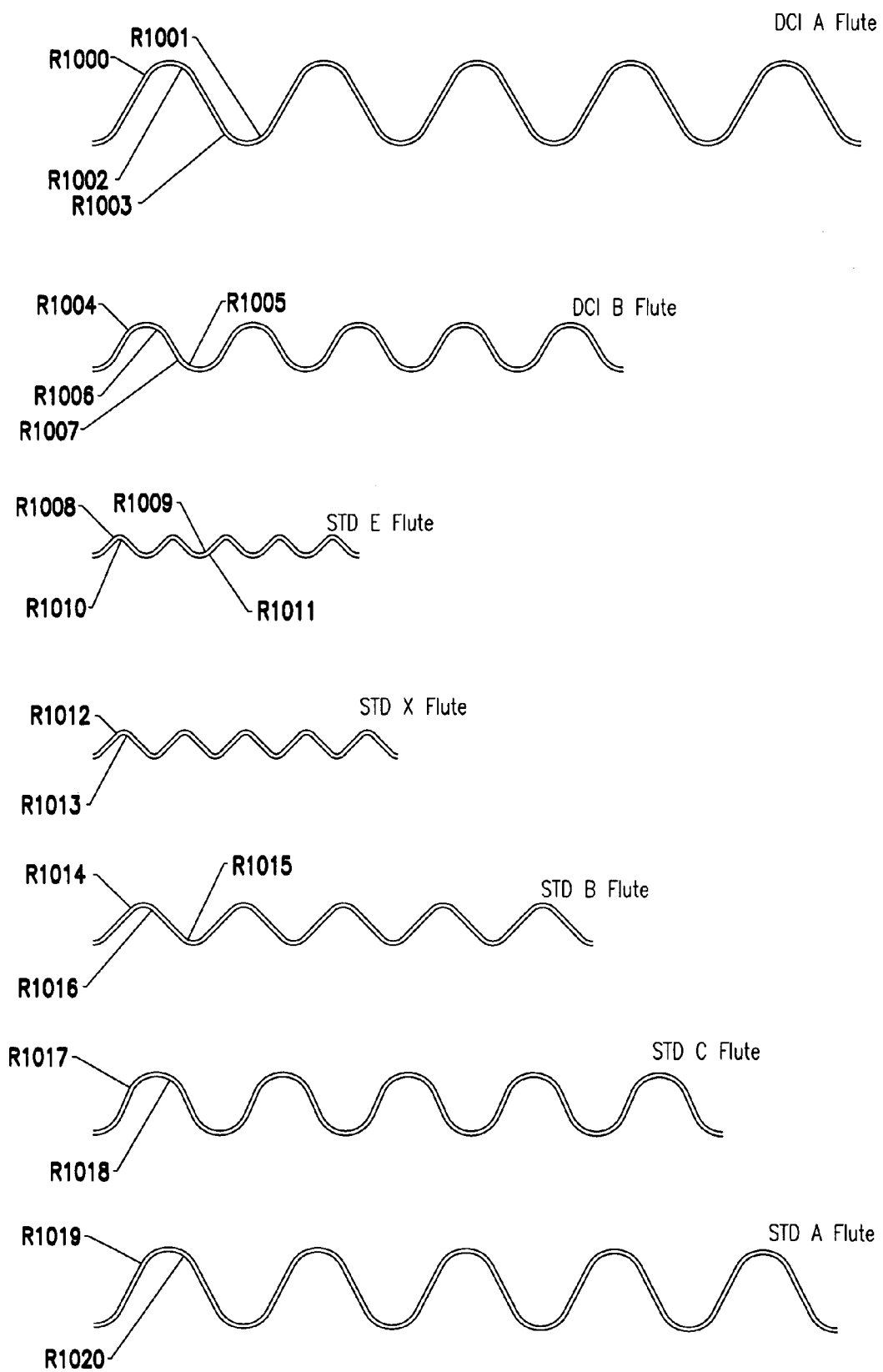
FIG. 3 includes schematic views of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Stacked Media Configurations Using Fluted Media, Generally

Figure 4:
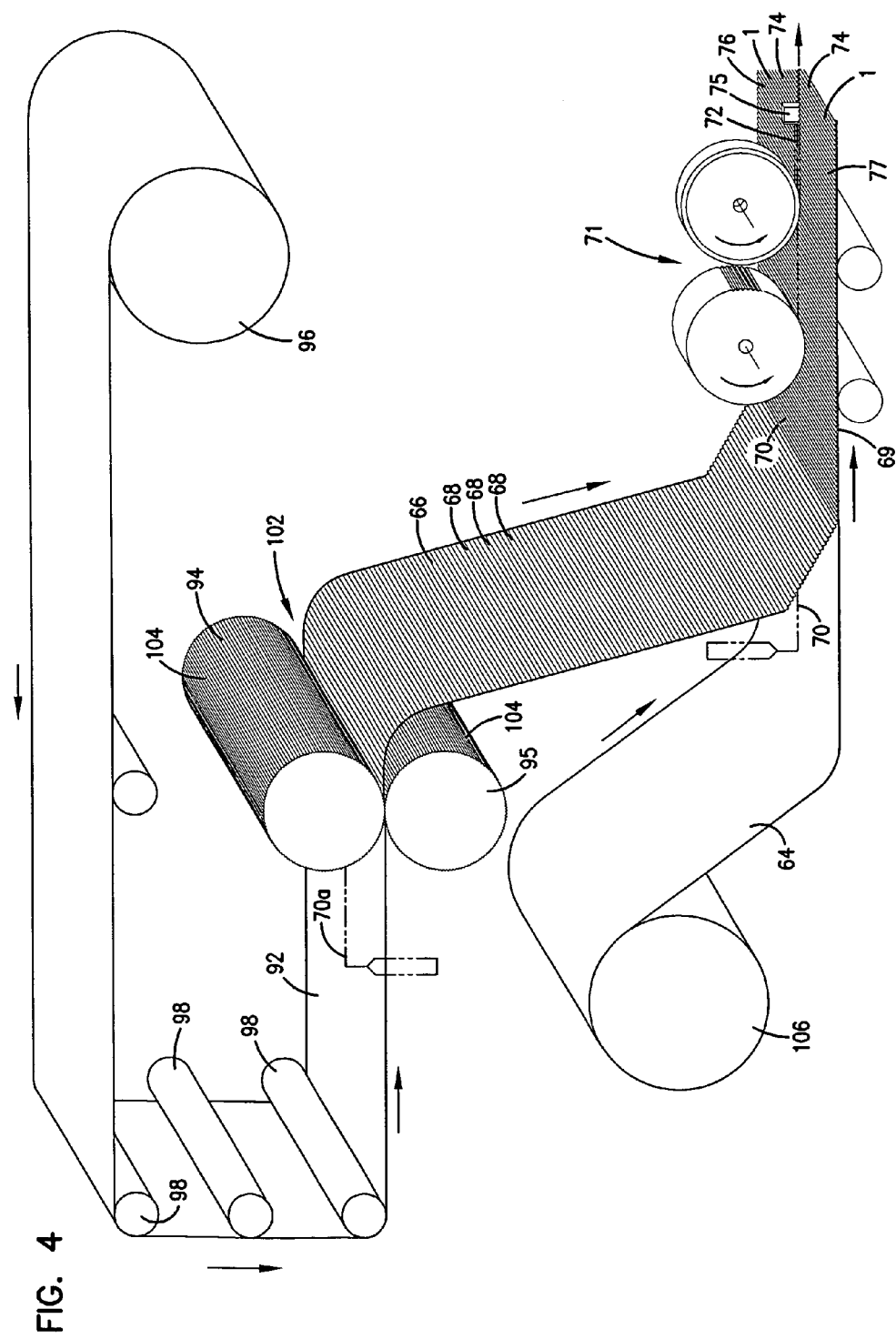
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1.

The term "single facer bead" meaning a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated (i.e., fluted) media sheet 66 is then secured to facing media sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One typical type of flute pattern will be a regular, typically curved, wave pattern corrugation, of straight flutes, as defined herein above. A typical regular curved wave pattern used, would be one in which the distance D2, as defined above, in a corrugated pattern is at least 1.2 times the distance D1 as defined above. In one typical application, typically D2=1.25–1.35×D1; in another D2=1.4–1.6×D1. In some instances the techniques may be applied with curved wave patterns that are not "regular," including, for example, ones that do not use straight flutes.

Figure 5:
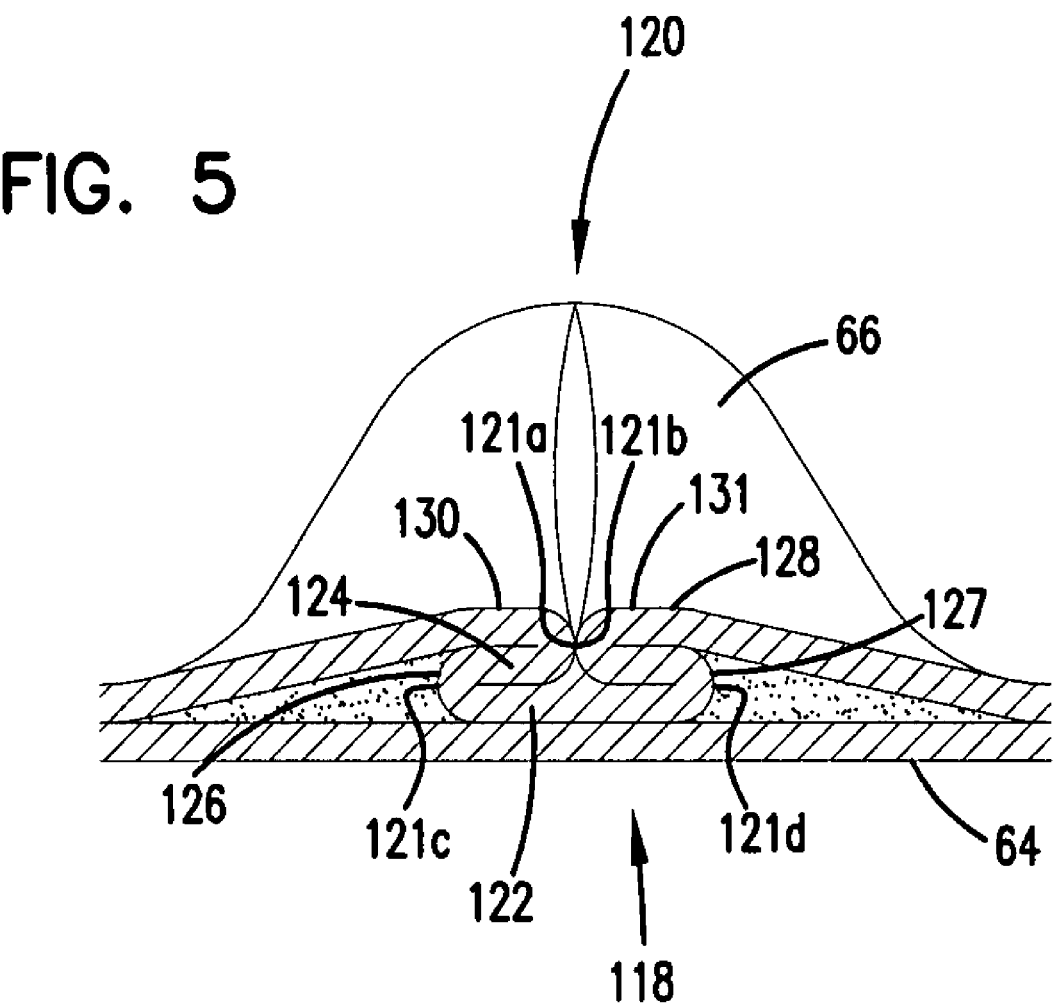
FIG. 5 is a schematic cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
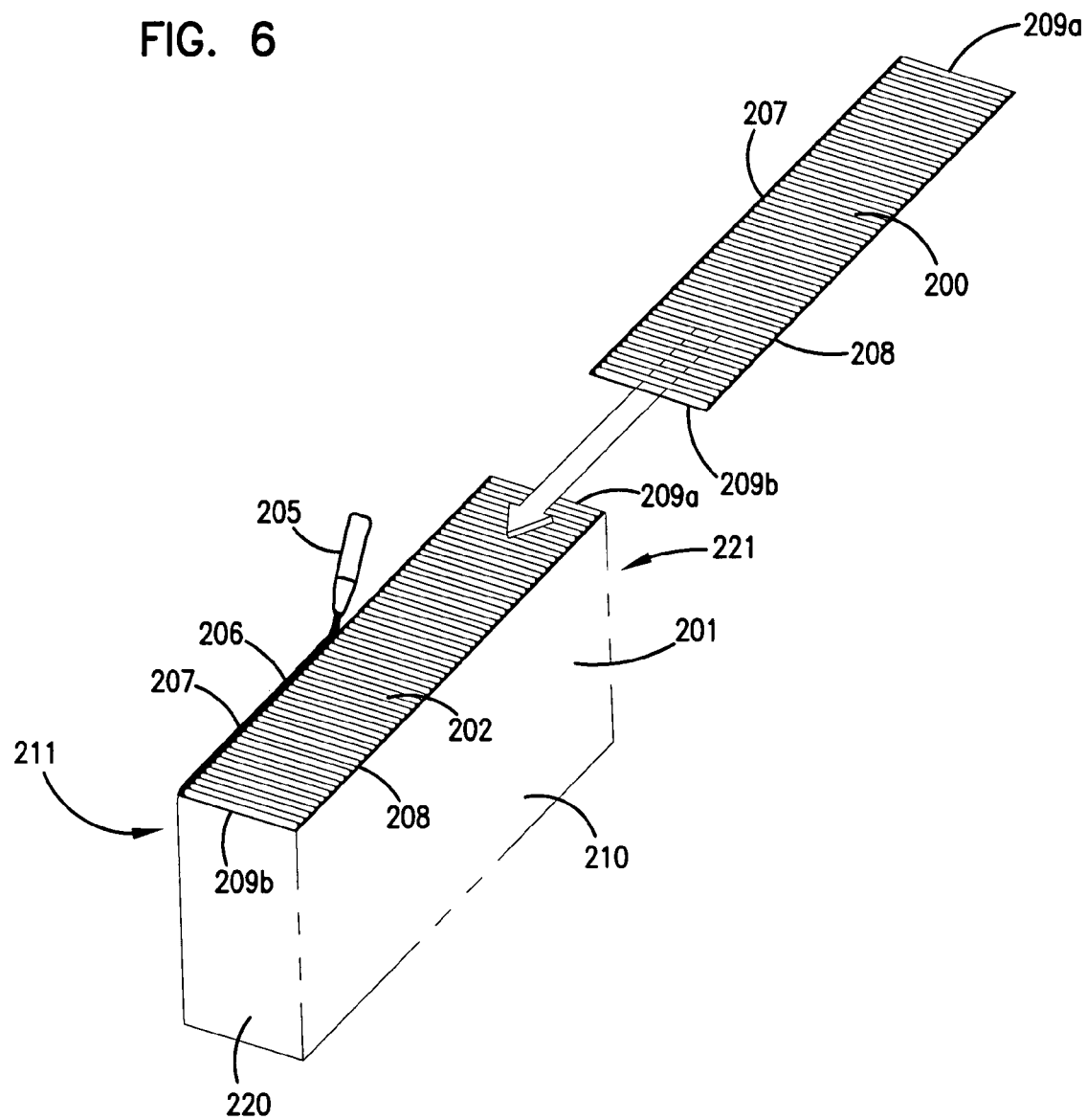
FIG. 6 is a schematic depiction of a step of creating a stacked z-filter media pack.

In FIG. 6, schematically there is shown a step of forming a stacked z-filter media pack from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces. Such a shape is discussed with respect to FIGS. 23 and 24.

In some instances, media pack 201 will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. An Example Air Cleaner and Components

A. Cross Reference to Other Described Air Cleaner Designs

The air cleaner and components described herein, in FIGS. 7-35, include certain features related to those of previously described air cleaner systems. In particular attention is directed to PCT application PCT/US 2005/020593 published as WO 2005/123222 A1 on Dec. 29, 2005 and, U.S. provisional application 60/725,453 filed Oct. 11, 2005; these references being incorporated herein by reference. Each of the previous systems was, in part, concerned with certain of the same general application needs as is the air cleaner of the present disclosure, for example: (a) convenient serviceability; (b) secure sealing between a service filter cartridge and a housing; (c) positioning under an engine hood with limited space requirements; (d) limited servicing space available; and (e) a desire to use a media pack comprising one or more stack strips of fluted sheeting secured to facing sheet. The air cleaner of FIG. 7-35, includes advantageous features now described and shown, not characterized in these previous filings.

It is noted that the techniques described herein can be applied in connection with the example arrangements developed and characterized. However, the techniques can be applied in a variety of other applications, including those that do not specifically relate to an under hood installation. Further, certain of the techniques can be applied in arrangements that do not use a stack of single facer strips. Also, it is not necessary for a component system or method to utilize all of the features characterized herein, to obtain some advantage according to the present disclosure.

B. The Air Cleaner of FIG. 7-35, Generally

Figure 7:
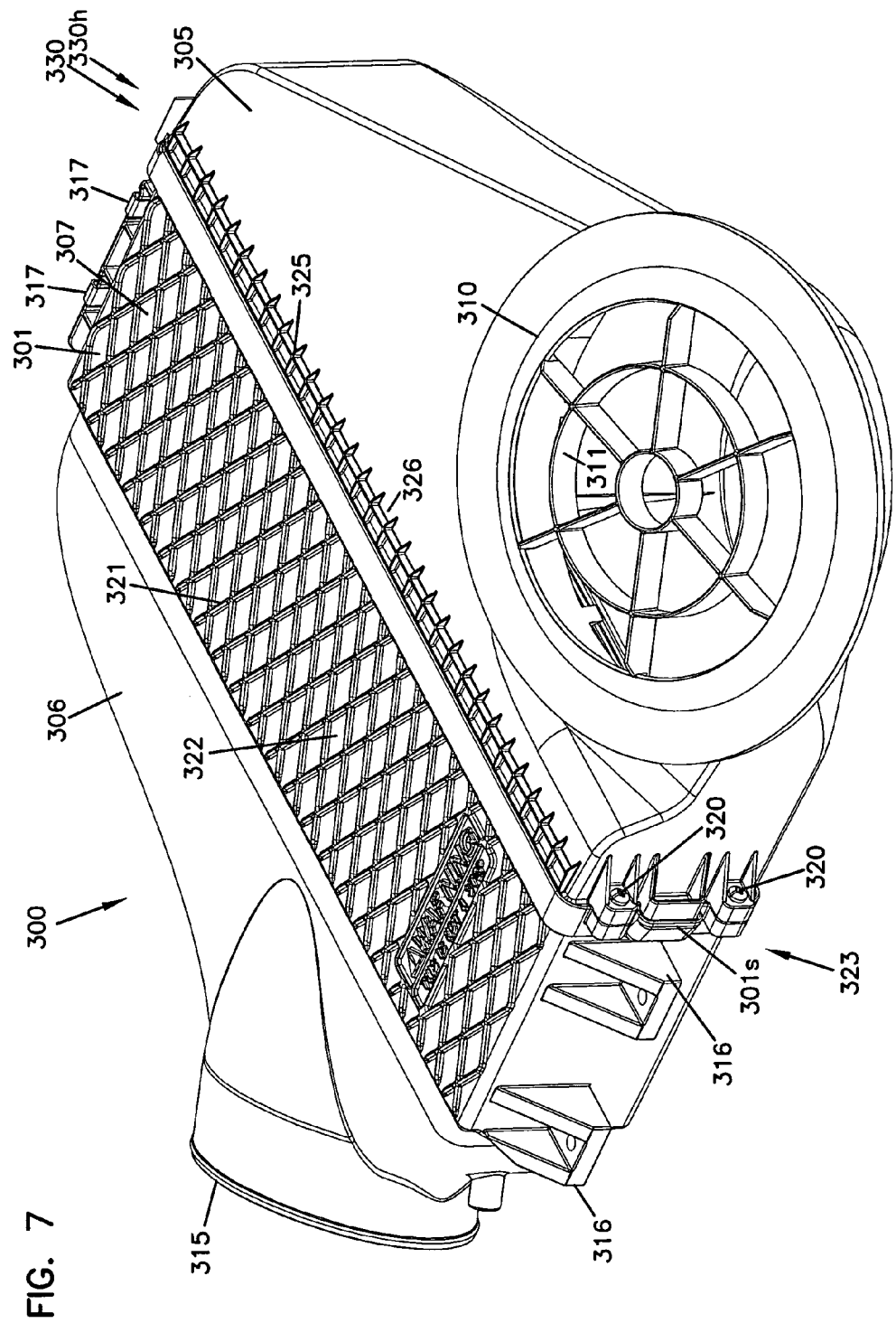
FIG. 7 is a top perspective view of an air cleaner assembly including features according to the present disclosure.

The reference numeral 300, FIG. 7, generally indicates an air cleaner arrangement or assembly including sections according to the present disclosure. The air cleaner assembly 300 comprises a housing 301 and an internally received serviceable filter cartridge, not depicted in FIG. 7; see cartridge 302, FIG. 10. The housing 301 includes an inlet section or component 305 and an outlet section or component 306, which separate along separation plane, region or line 301 s. The outlet section or component 306, for the air cleaner 300 depicted, comprises a body section 307, into which the cartridge 302 is positioned during installation.

Still referring to FIG. 7, the inlet section 305 includes an inlet adaptor 310, with an inlet aperture 311 therethrough. During operation, air to be filtered is passed into an interior of housing 301, with passage through inlet aperture 311. The adaptor 310 is configured to receive a bellows or similar construction inside of an engine compartment of a vehicle, for example a truck, during use. Adaptors having similar configurations to adaptor 310 are shown in PCT/US 2005/020593 and U.S. Provisional 60/725,453, incorporated herein by reference. In an alternate context, an analogously shaped adaptor is described in U.S. Pat. No. D460,169S, also incorporated herein by reference. For a typical air cleaner assembly 300, the adaptor 310 will be a preformed part, typically plastic, snap fit in position on a remainder of inlet section 305 during assembly.

During operation, unfiltered air which passes into interior through inlet 311, passes through inlet section 305 and toward outlet section 306. It is during that this process, that the air is passed through the cartridge 302, with filtering occurring. The filtered air leaves air cleaner assembly 300 through outlet 315.

Referring still to FIG. 7, mounting pads 316 are depicted for positioning and securing housing 301 in place. On an opposite side of housing 301 from pads 316 are provided additional mounting brackets 317. A variety of shapes, sizes, numbers and location mounting pads or brackets can be used, to securely position the air cleaner assembly arrangement 300 on or within a vehicle or other equipment.

Typically the example air cleaner assembly 300 depicted will be positioned on an engine block or over an engine block, although the principles described herein can be applied in other applications.

The cartridge 302 is a serviceable component. Thus, periodically as it becomes occluded or loaded with dust or other contaminant, it will be removed from housing 301 and be serviced. Servicing may take the form of replacing the cartridge 302 with a previously unused cartridge. In other instances the cartridge 302 is refurbished, or is replaced with a previously unused cartridge. Refurbishing would generally involve reducing the dust load in a used cartridge down to an acceptable level, for example by back flushing with compressed air, and then installing the refurbished cartridge. In any instance described (replacement with an unused filter, refurbishing or replacement with a refurbished filter), the housing 301 needs to be opened to provide service access to an interior thereof. Herein, when reference is made to "servicing" of an air cleaner, through replacement of a filter cartridge with a "new" filter cartridge, reference is meant to any of replacement with: a previously unused filter cartridge; a refurbished, previously used, filter cartridge; and/or, to installing the same filter cartridge but refurbished. That is, the terms "new" and "replacement with a new cartridge" and variants thereof, are not meant to be refer to a specific selection from among these choices, unless additionally specified.

Referring to FIG. 7, mounting posts 316 and brackets 317 are positioned on outlet section 306. Thus, in a typical installation, the outlet section 306 will not be movable without dismounting the air cleaner housing 301 from the equipment in which it is installed. Inlet section 305, on the other hand, is configured as a removable service cover for access to an interior of housing 301. Thus, for the example shown, section 305 is mounted on section 306, and it is not separately secured to the equipment in which air cleaner 300 is installed. In FIG.

7, bolts 320 are shown securing the cover or inlet section 305 in place. Removal of the bolts 320, allows for service access to an interior of housing 301.

Still referring to FIG. 7, attention is directed to reinforcing rib pattern 321 positioned on an upper surface 322 of section 306. A variety of rib patterns can be used, rib pattern 321 being an example. The rib pattern 321 provides for strengthening of the surface 322, when section 306 is a molded, plastic, component, as would be typical for both of sections 305, 306. The rib pattern 321, then, would be molded as part of section 306. It is anticipated that an opposite surface 323 to surface 322 can be provided with an analogous rib pattern if desired. The particular rib pattern 321 depicted, is a matter of choice to not only serve the strengthening function, but also to provide an attractive, distinctive, appearance. A wide variety of alternate rib patterns can be incorporated.

It is also noted that inlet section 305 includes a grid pattern 325 on side 326 adjacent the location where it engages housing section 306 when mounted. Grid pattern 325 also provides for strengthening, in this instance of section 305. An analogous grid pattern to pattern 325 would typically be positioned on an opposite side (from side 326) of housing section 305. The specific grid pattern is a matter of choice, and the one chosen also provides for a distinctive appearance.

Although the principles described herein can be applied in a variety of applications, it is anticipated that in a typical application sections 305 and 306 would be molded from a plastic suitable for use as an air cleaner housing, for example a glass filled nylon, if high temperatures are a concern; or, a glass and mica filled polypropylene, if temperature conditions are expected to be less rigorous.

Figure 8:
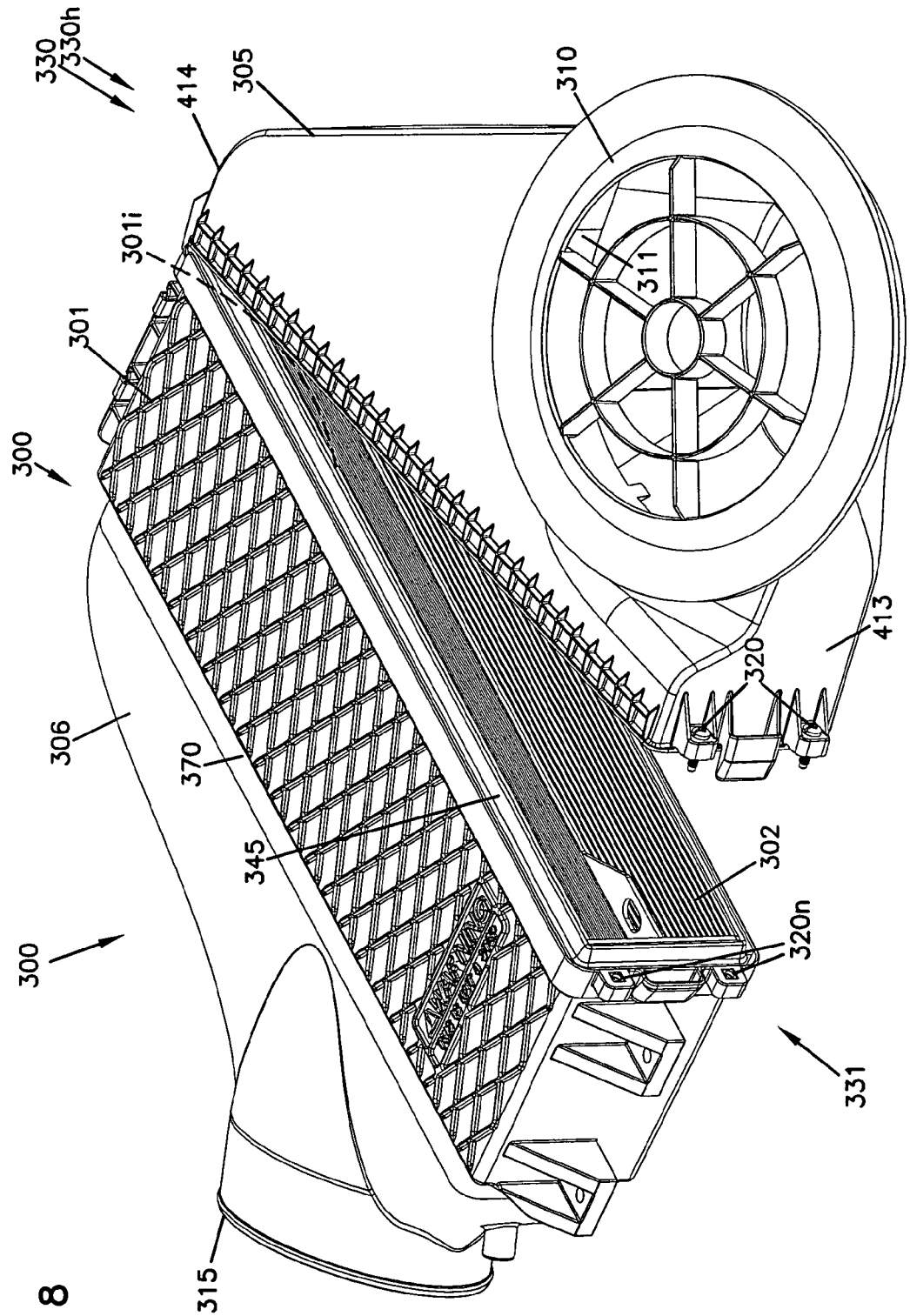
FIG. 8 is a schematic view of the air cleaner assembly of FIG. 7, shown during a step of opening for servicing.

Attention is now directed to FIG. 8. In FIG. 8 a view analogous to FIG. 7 is depicted, except bolts 320 have been loosened, allowing for a pivoting of section 305 away from section 306 providing access to an interior 301$i$ of housing 301, and the serviceable filter cartridge 302. Adjacent edge 330, a releasable hinge is provided between sections 305, 306, to allow complete separation of section 305 from section 306, upon appropriate rotation and manipulation of section 305.

Still referring to FIG. 8, cartridge 302 includes a housing seal arrangement 345, discussed below, which provides for a sealing between the cartridge 302 and the housing 301, to inhibit unfiltered air from reaching outlet 315; i.e., to prevent unfiltered air entering inlet 311 from bypassing media in cartridge 302, in flow toward outlet 315 during operation. This housing seal arrangement 345 is also discussed in further detail below.

Still referring to FIG. 8, at 320$n$, along edge 331 (opposite edge 330) nut plates are provided, for bolts 320 encountered during tightening. The nut plates 320$n$ would typically comprise metal fittings secured within the plastic construction of housing section 306.

Figure 9:
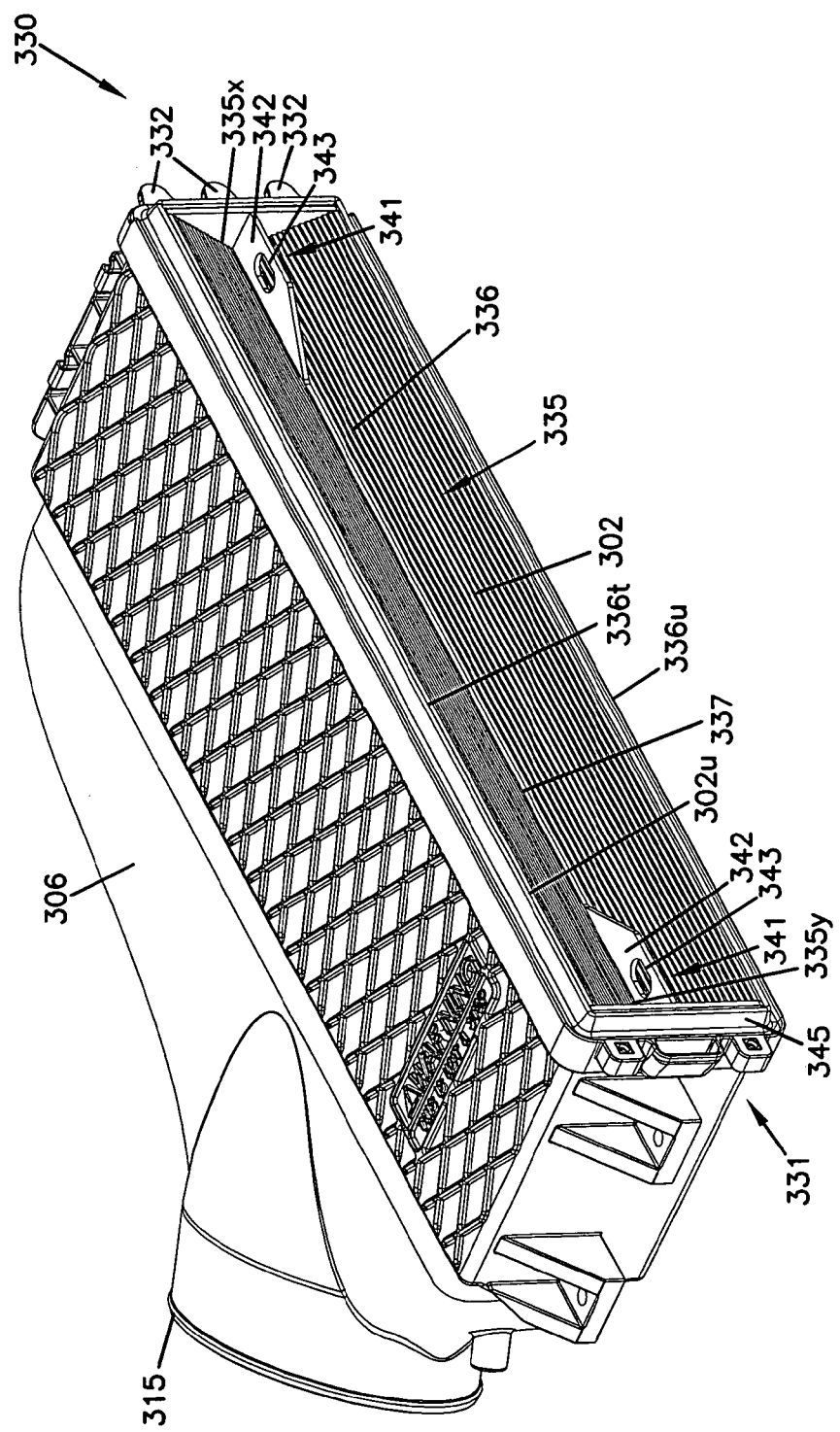
FIG. 9 is a schematic perspective view of a body/outlet section or component of the air cleaner of FIGS. 7 and 8, depicted with an inlet section or component removed, and with a serviceable filter cartridge component viewable.

Attention is now directed to FIG. 9, in which section 306 is depicted with inlet section 305, FIGS. 7 and 8 removed, and with cartridge 302 installed, as it would be during normal servicing and operation. It is noted that along edge 330, section 306 includes hinge protections 332 sized and positioned to engage, pivotally, a portion of housing section 305, during use. This portion of housing section 305 is discussed below, in connection with FIG. 35. In the example shown there are three (3) hinge projections 332, although alternatives are possible.

Referring still to FIG. 9, the cartridge 302 comprises a stacked z-filter media arrangement 335. By this it is meant that z-filter media arrangement 335 comprises a plurality of stacked strips, of fluted single facer media secured to facing media, with definition of inlet flutes and outlet flutes, in accord with the general z-filter media discussion provided above. In FIG. 9, first face 336 of z-filter media arrangement 335 comprises an inlet face. The inlet face 336 is configured with a central recessed region 337, in this instance extending across the stacked z-filter media arrangement 335, between opposite side ends 335$x$, 335$y$. The term "center recessed region" and variants thereof, is meant to refer to a portion of inlet surface 336 which is not planar, but rather is a portion recessed toward an opposite (outlet) face of the media arrangement 335 relative to other portions. In this instance the center section 337 is recessed relative to upper and lower edges 336$t$ and 336$u$, for example.

Horizontal lines across inlet face 336 are meant to be schematically representative of single facer strips, and no specific number of layers is intended.

In part due to recessed central region 337, cartridge 302 can be conveniently provided with a handle arrangement, for example without the need for the handle arrangement to project at all, or at least as much, beyond a plane of an upstream edge 302$u$ of the cartridge 302, in a direction away from outlet 315 and in outlet face of cartridge 302. In FIG. 9, such a handle arrangement is indicated generally at 341 comprising spaced handle members 342 each having a central finger aperture arrangement 343 therein. Herein the term "plane of an upstream edge 302$u$" and variants thereof, is meant to refer to a plane generally defined by a tip of cartridge 302, projecting in a direction opposite outlet 315 and a downstream face of cartridge 302, when cartridge 302 is installed in housing section 306. In the example shown, handle arrangement 341 does not project beyond a plane of upstream edge 302$u$, in a direction away from an outlet face of cartridge 302.

Still referring to FIG. 9, the cartridge 302 includes housing seal member 345 thereon, defining the periphery adjacent a separation plane, region or line 301$s$ between housing sections 305, 306. When housing section 305 is positioned in place, housing seal member 345 is compressed between the sections 305, 306, to form a seal. A particular example configuration for housing seal arrangement 345 to provide for this operation, is discussed below. When in an uncompressed state, for the example shown, the housing seal member 345 will define a plane of the upstream edge 302$u$ of cartridge 302 referenced above; and, the handle arrangement 341 does not project beyond uncompressed housing seal member 345, in a direction away from outlet 315 or an outlet face of cartridge 302.

Figure 10:
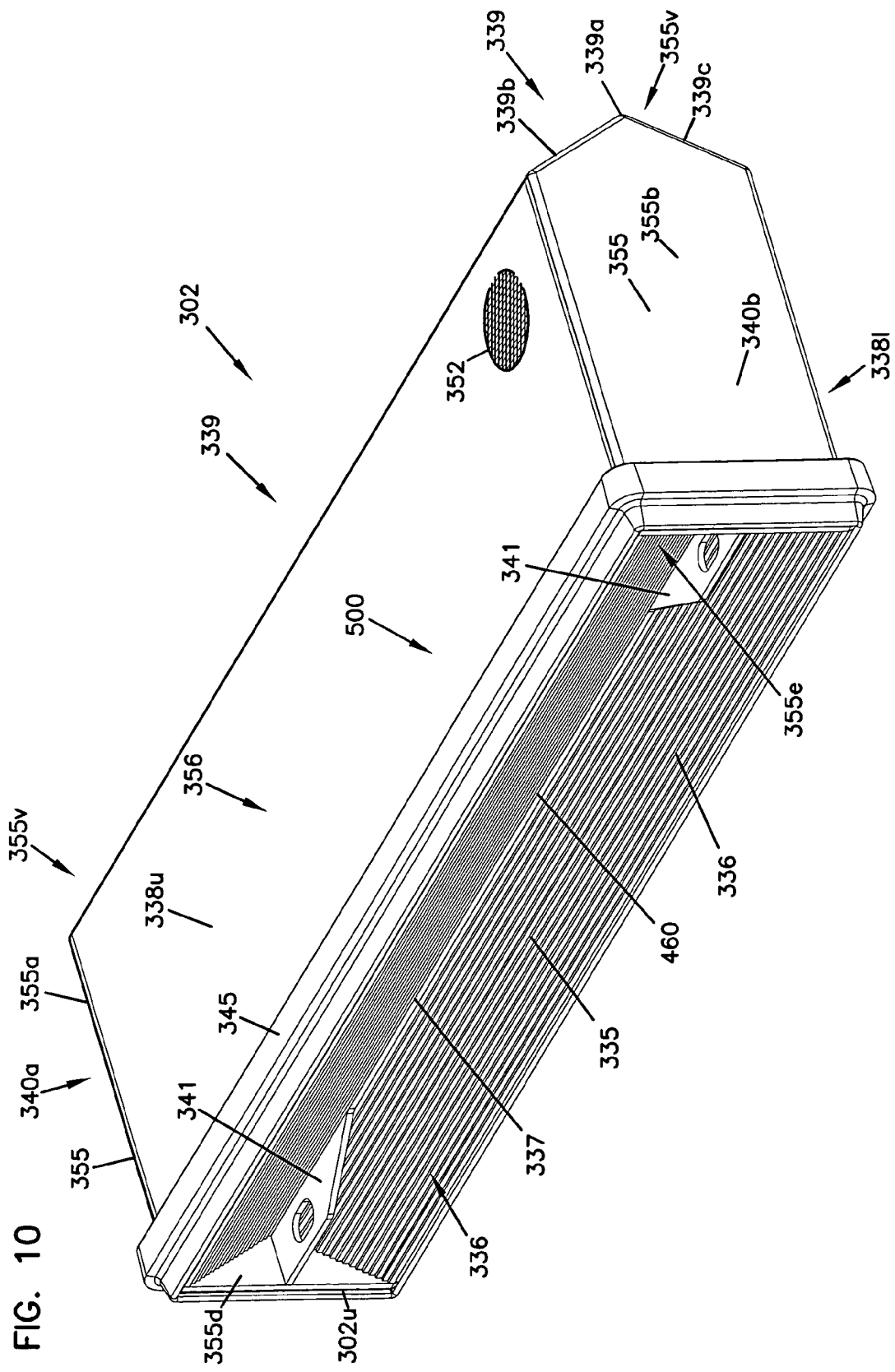
FIG. 10 is a schematic, perspective, view of the serviceable filter cartridge component positionable within the air cleaner assembly of FIGS. 7-9.

As is typical for a z-filter media construction, a set of inlet flutes is open at the inlet face 336 and closed adjacent opposite outlet face 339 (FIG. 10); and, a set of outlet flutes is closed adjacent inlet faced 336 and open adjacent to second or outlet face 339 (FIG. 10). (As discussed below, many of the principles described herein can be applied when the flow face having the recess is an outlet flow face and the flow face having a central projection is an inlet flow face, i.e., arrangements with opposite flow to arrangement 300, FIG. 8.)

In general, then, servicing of the air cleaner is as follows: section 305 is separated from section 306, by loosening of bolts 320 and pivoting around a hinge arrangement 330$h$ at edge 330, FIG. 8, as described. The cartridge 302 can be manipulated, for example by the handle arrangement 340, to be removed from the inlet section 306. A "new" cartridge is then installed in reverse manner. Inlet section 305 is then remounted with appropriate pivoting, and securing in position with bolts 320.

C. The Filter Cartridge 302, Generally; FIGS. 10-14

Attention is now directed to FIG. 10, in which cartridge 302 is depicted in a schematic, perspective view. Referring to FIG. 10, cartridge 302 comprises a stacked z-filter media arrangement 335 having a first, in this instance inlet, face 336, an opposite second, in this instance outlet, face 339, an upper side 338$u$; an opposite lower side 338$l$, and opposite side ends 340$a$, 340$b$. The stacked z-filter media arrangement 306 generally comprises one or more stacks of strips of single facer material as discussed above, in this instance each strip comprising a fluted sheet secured to a facing sheet. The strips are organized with flutes extending between inlet face 336 and outlet face 339, extending parallel to sides 340$a$, 340$b$.

Figure 12:
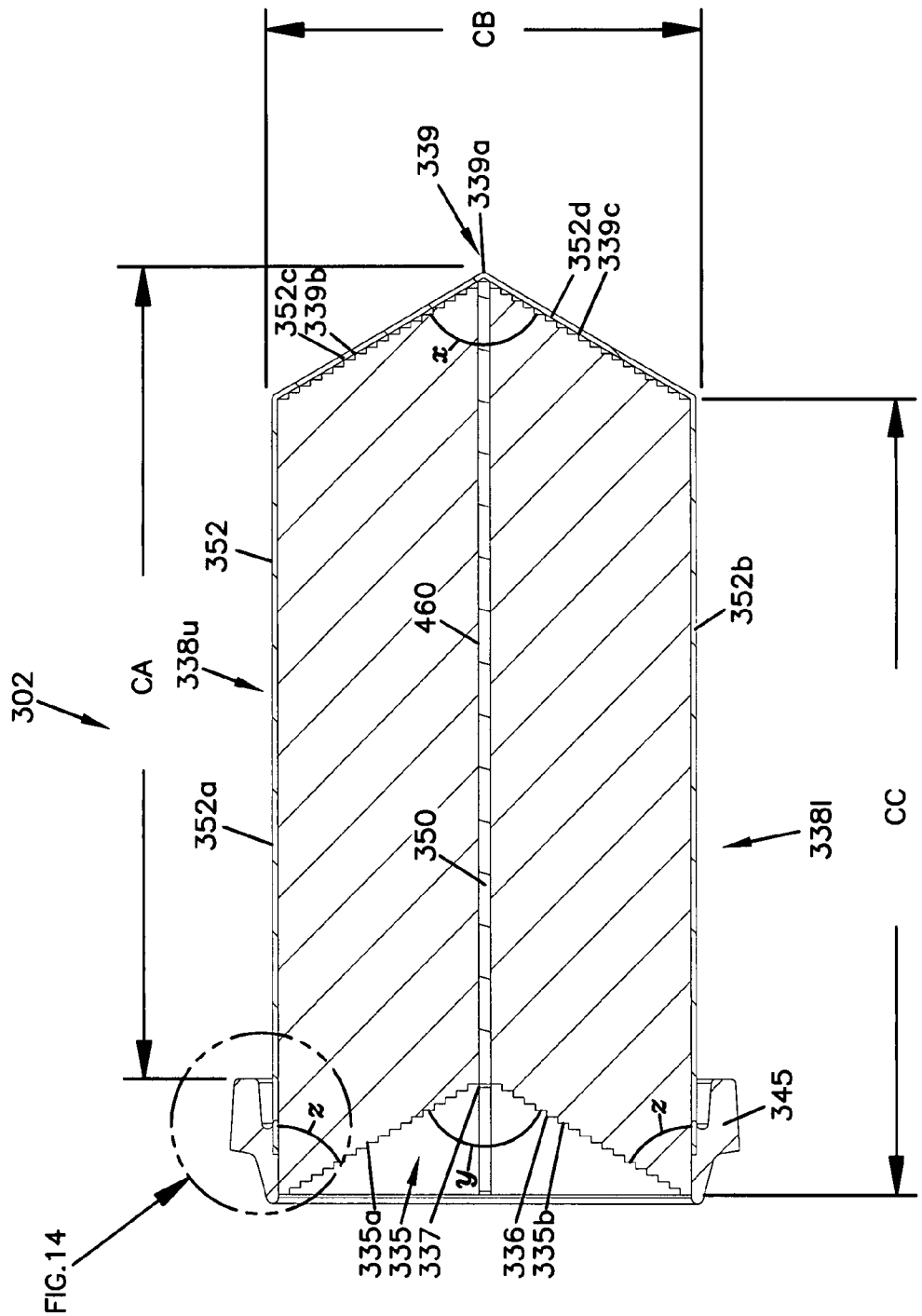
FIG. 12 is a schematic cross-sectional view taken along line 12-12, FIG. 11.

In FIG. 11, the first in this instance inlet, face 336 of the cartridge 302 is depicted. In FIG. 12 a cross-sectional view taken along line 12-12, FIG. 11 is viewable.

Referring to FIG. 12, cartridge 302 depicted comprises a stacked z-filter media pack arrangement 335 comprising two stacked media pack sections 335$a$, 335$b$, in this example separated by a center piece 350, in the example shown piece 460, discussed below. For the particular example shown, media pack sections 335$a$, 335$b$, are analogous to one another, and positioned as mirror images on opposite sides of center piece 350, although alternatives are possible. Each stacked media pack section 335$a$, 335$b$, would typically comprise a stack of single facer strips.

Still referring to FIG. 12, for the cartridge 302 depicted, a support screen member 352 is shown positioned in overlap with media pack first or top side 338$u$, media pack second or bottom side 338$l$, and media pack outlet face 339. In particular, screen 352 includes top 352$a$, opposite bottom 352$b$, and end sections 352$c$ and 352$d$. The screen 352 may comprise, for example, a plastic mesh folded or otherwise formed into the configuration shown. This is discussed in association with FIGS. 27-30, below. It is noted that in the example shown, the screen 352 does not extend across the inlet face 336.

In FIG. 12, second, in this stance outlet, flow face 339 includes central apex 339$a$ with upper section 339$b$ and lower section 339$c$, on opposite sides thereof. Sections 339$b$, 339$c$, the apex 339$a$, form a V or arrow shape, projecting outwardly from a remainder of media pack arrangement 335 in a direction opposite inlet face 336. In typical arrangements, the internal angle of the v-shape around apex 339$a$ would be within the range of 50° to 150°, inclusive; typically 80°-130°, inclusive. A similar angle would be found around recess 337 in face 335. Screen sections 352$c$, 352$d$, extend over outlet end face sections 339$b$, 339$c$ respectively.

Still referring to FIG. 12, in general terms cartridge 302 comprises stack z-filter media arrangement 335 comprising two slanted stack media pack sections 335$a$, 335$b$, each having an internal acute angle z within the range of 20° to 80°, inclusive, typically 25°-70°, inclusive, and oriented such that a first slanted face of each, i.e., faces 335$a$, 335$b$, are directed toward one another around a central recess 337 to form a v-shaped recess angle y; and such that opposite faces 339$b$, 339$c$ are oriented around center 339$a$ directed away from one another at a slant, defining a central v-shaped angle x; with, angle y typically being within the range of 50°-150°, inclusive, typically 80°-130°, inclusive; and, angle x typically being within the same ranges. Further, the media pack sections 335$a$, 335$b$ are typically oriented toward one another and opposite sides of center piece 350, which typically has a flat, imperforate, region between the media packs. Further, as will be discussed below, sections 335$a$, 335$b$ are typically oriented with a fluted side of each, directed toward and sealed to the center piece 350.

Referring again to FIG. 10, side ends 340$a$, 340$b$ are covered by end side pieces 355. i.e., pieces 355$a$, 355$b$. The side end pieces 355 are typically molded-in-place, and secure closed opposite ends of single strips within the media pack 306. These ends, for example, would correspond to ends 209$a$, 209$b$, FIG. 6. Further, the end pieces 355 (355$a$, 355$b$) would typically be molded-in-place with portions of the screen 352 embedded therein, securing the screen 352 in position. Thus, typically when molded in place, the end pieces 355 secure the two stacked media pack sections 335$a$, 335$b$, the center piece 460, discussed below, and the screen 352 together into a subassembly 356, before the housing seal member 345 is secured in place.

Typically the end pieces 355 would be positioned underneath associated sections of the housing seal arrangement 345, as discussed below.

Still referring to FIG. 10, it is noted that side pieces 355 include first, in this instance, inlet, end sections 355$d$, 355$e$ adjacent opposite sides 340$a$, 340$b$ respectively, and adjacent upstream edge 302$u$ of cartridge 302. Sections 355$d$, 355$e$ project forwardly, from a most recess region 337 of first, in this instance inlet or upstream, face 336 at media pack arrangement 335, and, for the example shown, extend beyond handle arrangement 341, toward edge 302$u$, when a cartridge 302 is not installed. Sections 355$d$, 355$e$, which for the example shown are generally triangular in shape, and include portions of arrangement 341 embedded therein, provide for protection of cartridge 302 adjacent inlet face 336, as well as ease of installation and securing of handle member 341 in place.

In FIG. 11, a schematic, end elevational view of cartridge 302 is depicted, toward first, in this instance inlet, face 336. In FIG. 11, horizontal lines are used to schematically depict various single facer strip layers, in the media pack arrangement 335. The schematic depiction is not meant to indicate any specific number of layers.

Figure 14:
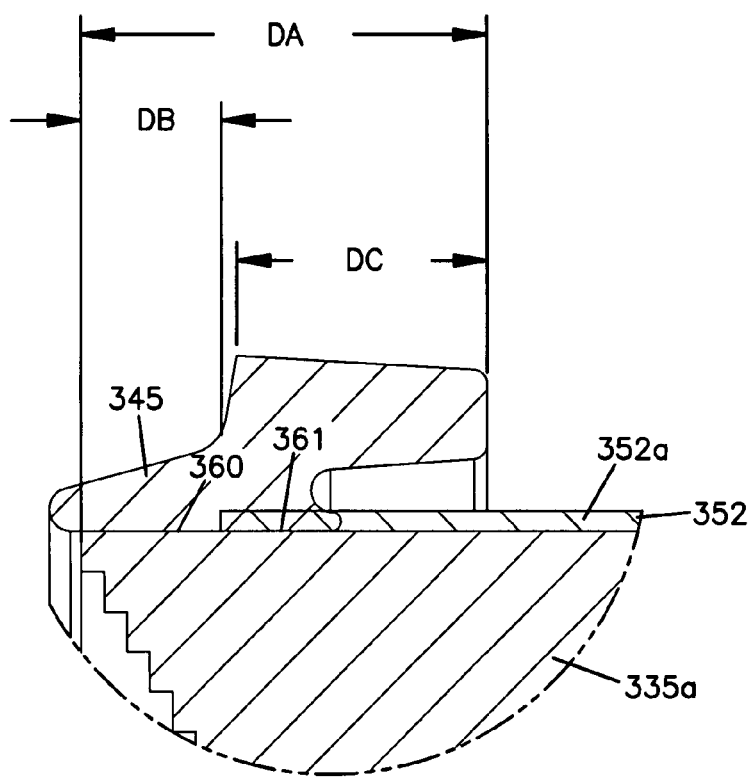
FIG. 14 is a schematic enlarged fragmentary view of a portion of FIG. 12.

In FIG. 13, a schematic top plan view of cartridge 302 is depicted. In FIG. 14, an enlarged, schematic, fragmentary view of a portion of FIG. 12 is depicted.

Referring to FIG. 14, a portion of media pack section 335$a$ is schematically depicted, with mesh section 352$a$ thereon, and housing seal member 345 molded thereon. For the example shown, the housing seal member 345 is molded directly to a portion of media pack 335$a$, in section 360, without mesh 352 extending thereover. Housing seal member 345 is molded to the media pack 335$a$ in section 361, with a portion of mesh section 352$a$ also embedded in the housing seal arrangement 345, and adjacent media pack section 335$a$.

Assembly of the cartridge 302, and specific features of the cartridge 302, are discussed below, in connection with FIGS. 23-34.

D. Installation of Filter Cartridge 302 Within Housing 301, FIGS. 15-22

In FIG. 15, a side or open end, schematic, elevational, view of section 306 is depicted, with the cartridge 302 removed. The view of FIG. 15, is into an opening formed when the cartridge 302 is removed and inlet section 305 is not mounted in place.

Referring to FIG. 15, at 320$a$, posts with threaded nut plates 320$n$ therein are provided at side 331, for receipt of bolts 320, FIGS. 7 and 8, during attachment of the inlet section 305. At 332, the mounting posts for the hinged operation are shown, along side 330.

Viewing into interior 306$i$ of section 306, outlet 315 can be viewed. Also at 368 an engagement arrangement for a pressure tap or similar sensing equipment is provided.

Within interior 306i, along an interior 370i of region 370, FIG. 8, spaced ribs are provided. The spaced ribs are shown in FIG. 15, at 371. The ribs 371 help prevent interpretation of the interior surface 370i of region 370 as a seal region. The ribs 371 are spaced along upper and lower regions of rim 370. Alternate spacing and numbers of ribs can be used.

Along opposite sides, ribs 372 are provided. As discussed with respect to further figures described below, the ribs 372 help provide a secure engagement between the cartridge 302 and the housing section 306.

Attention is now directed to FIG. 16, which provides a cross-sectional view of FIG. 15, taken along line 16-16 thereof. Referring to FIG. 16, vertically spaced ribs 372 are viewable along a portion of interior sidewall 375. The ribs 372 are specifically positioned along a portion of wall 375 adjacent v-shaped (or arrow-shaped) projection or receiver 376, having sides 377, 378, and apex 379. Along interior wall 380, FIG. 15, opposite wall 375, an analogous set of ribs 372, and analogous v-shaped or arrow shaped receiver projection or 376 are positioned, for example as mirror images.

When the cartridge 302, FIG. 10, is inserted into interior 306i, end 339 will be first inserted. As end 339 is further inserted, the ribs 372 on walls 375, 380 respectively, will be engaged by side pieces 355. The side pieces 355 are typically formed from a compressible foam polyurethane, and will be deformed and squeezed by the ribs 372, to help secure the cartridge 302 in position. In addition, v-shaped receivers 376; will receive and engage v-shaped edges 355v, FIG. 10, of the side pieces 355 stopping insertion of cartridge 302. Receipt of v-shaped edges of side pieces 355 into v-shaped receivers 376 will help inhibit the cartridge 302 from moving under vibration and shock.

More specifically, the ribs 372 and v-shaped receivers 376 will generally engage end pieces 355, when cartridge 302 is positioned within section 306. When the end pieces 355 comprise compressible polyurethane foam, the foam will provide a dampening effect between cartridge 302 and housing section 306, to advantage.

Still referring to FIG. 16, along edge 390, section 306 includes a housing seal receiver arrangement 391. The receiver arrangement 391 circumscribes an inlet aperture 393, through which portions of cartridge 302 are inserted, during installation. Receiver arrangement 391 receives a portion of housing seal arrangement 345 on the cartridge 302, and is positioned to engage housing section 305, with the seal arrangement 345 compressed and sealed therebetween.

Figure 17:
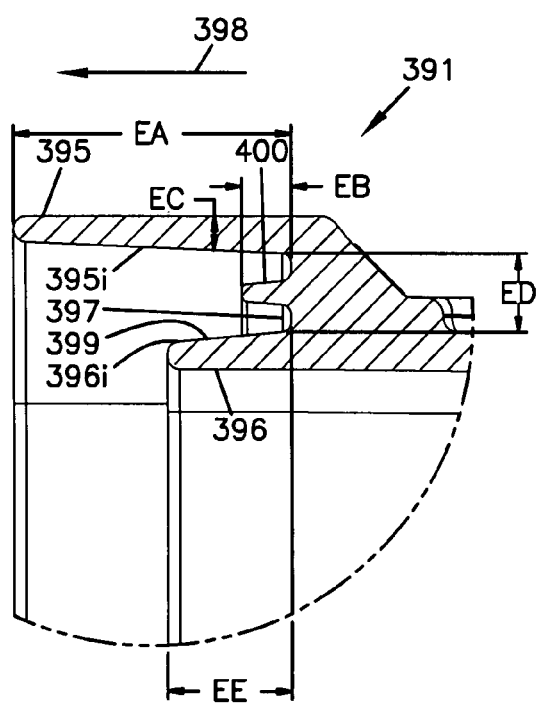
FIG. 17 is an enlarged fragmentary view of a portion of FIG. 16.

In FIG. 17, receiver arrangement 391 is depicted in an enlarged, fragmentary, view, relative to FIG. 16. It will be understood that in general the receiver arrangement 391 will have a similar profile in extension completely around inlet aperture 393. In general, the receiver arrangement 391 comprise outer wall projection 395 and inner wall projection 396, separated by base 397. Outer wall projection 395 generally is longer than inner wall projection 396, in extension from base 397 in a direction indicated by arrow 398, FIG. 17; i.e., in a direction away from outlet face 339, FIG. 10. The walls 395, 396 are generally spaced apart, defining seal receiving region 399 therebetween, with base 397 forming a closed end to receiving region 399. Projecting from base 397 in the direction of arrow 398, is seal projection 400, centrally positioned between interior surfaces 395i, 396i of wall sections 395 and 396 respectively. The projection 400 is configured and positioned to be pressed into a portion of the housing seal arrangement 345, during cartridge installation. This is shown and discussed below in connection with FIGS. 21 and 22.

Typically the projection of rib 400 out from base 397 is a distance of at least 2 mm and not more than 6 mm, usually about 3 to 5 mm. Alternatives are possible.

Figure 18:
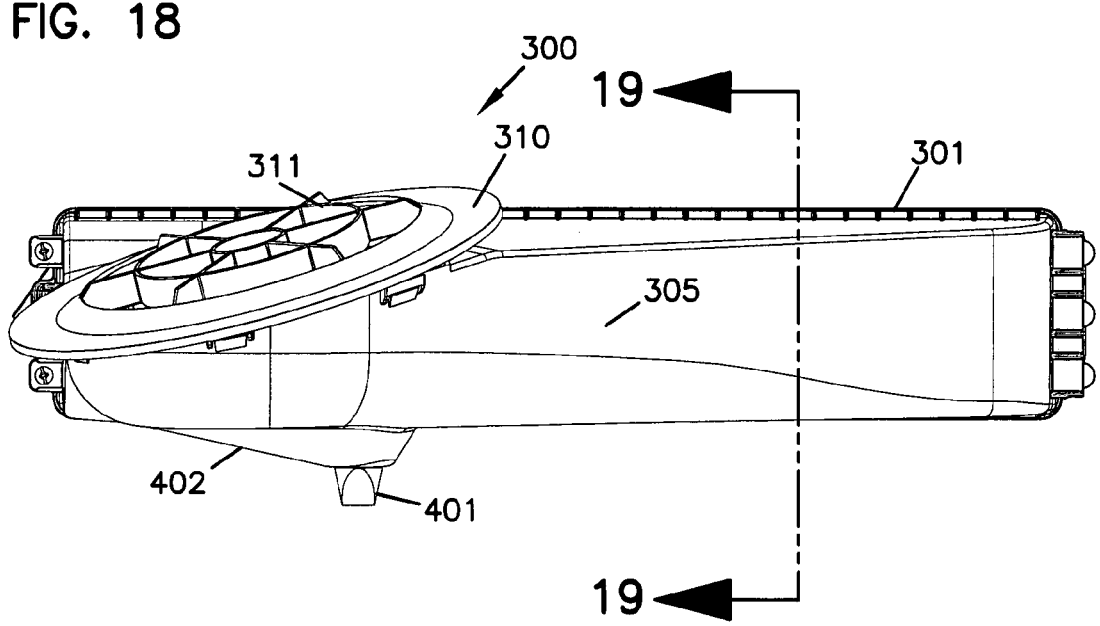
FIG. 18 is a schematic end elevational view of the air cleaner assembly depicted in FIG. 7.

Attention is now directed to FIG. 18, an end view of air cleaner 300. In FIG. 18, ejector valve 401 is shown positioned within housing inlet section 305, on a lower or funnel collector region 402. Valve arrangement 401 would typically comprise a rubber flexible valve, or similar arrangement, allowing for drainage of water that might collect within inlet section 305, i.e., in region 402 by passage through inlet 311, typically upstream of an internally received filter cartridge.

Figure 19:
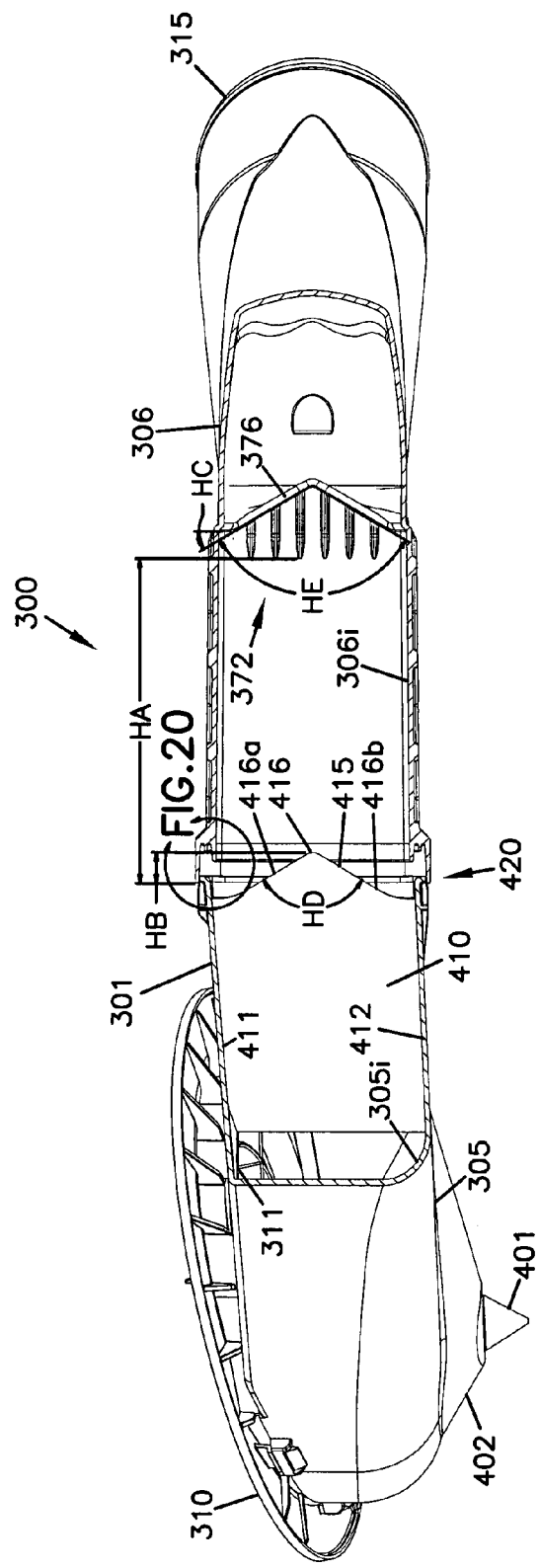
FIG. 19 is a schematic cross-sectional view taken along line 19-19, FIG. 18, depicting the air cleaner without the filter cartridge of FIG. 10 positioned therein.

FIG. 19 is a cross-sectional view taken along line 19-19, FIG. 18. In FIG. 19, the air cleaner 300 is depicted without a cartridge 302 received therein. Referring to FIG. 19, the cross-sectional view shows certain portions of interior 305i of section 305, as well as the portions of interior 306i of section 306 discussed above in connection with FIG. 16. Referring to FIG. 19, it can be seen that section 305i includes center divider or vane 410 therein, positioned in extension between upper and lower walls or surfaces 411, 412 of section 305, downstream from inlet aperture 311. The vane 410 is typically positioned approximately halfway between opposite sides 413, 414 of section 305, FIG. 8. The vane 410 helps prevent deformation of the shape of the section 305, especially with respect to upper and lower walls or surfaces 411, 412. Further, for the example shown, the vane 410 includes a downstream edge 415 defining a v-shape or arrow shape, with a central apex 416, and with opposite downstream, side, edge sections 416a, 416b. The central apex 416 is configured to project toward, and typically partially into, the region defined in cartridge 302 by central recess 337, FIG. 9.

The position orientation of vane 410 is a matter of choice, for the system involved. The vane 410 can be directed such that a plane of the vane 410 is parallel to flow direction between opposite flow faces of the filter cartridge 302 when installed. On the other hand, the vane 410 can be positioned at an angle, for example centered along a diameter of aperture 311 and projection. For the example vane 410 of FIG. 19, this is the orientation, as will be understood upon inspection of FIG. 36 discussed below.

Figure 20:
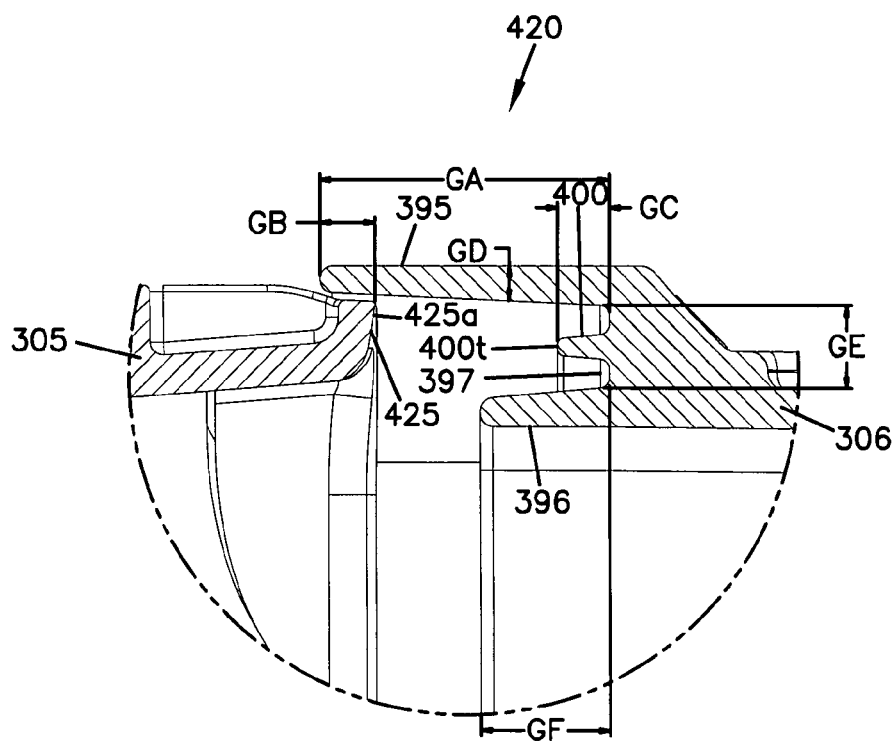
FIG. 20 is an enlarged fragmentary view of a portion of FIG. 19.

In FIG. 19, a region of engagement 420, between sections 305, 306 is shown. In FIG. 20, this region 420 is shown in enlarged fragmentary view. It can be seen that section 305 includes a seal compressor flange 425 thereon. The seal compressor flange 425 would generally extend completely around a perimeter of section 305, where engagement with section 306 is encountered. Pressure flange 425 is generally positioned directed with a compression surface 425a thereof oriented toward seal projection 400. In use, as will be discussed below in connection with FIGS. 21 and 22, a portion of housing seal member 345 of cartridge 302 will be compressed between base 397 and pressure flange 425, during installation.

A distance between pressure flange 425 and a tip 400t of seal projection 400 will typically be at least 8 mm, not more than 18 mm, often within the range of 10 mm to 16 mm, although alternatives are possible.

Figure 21:
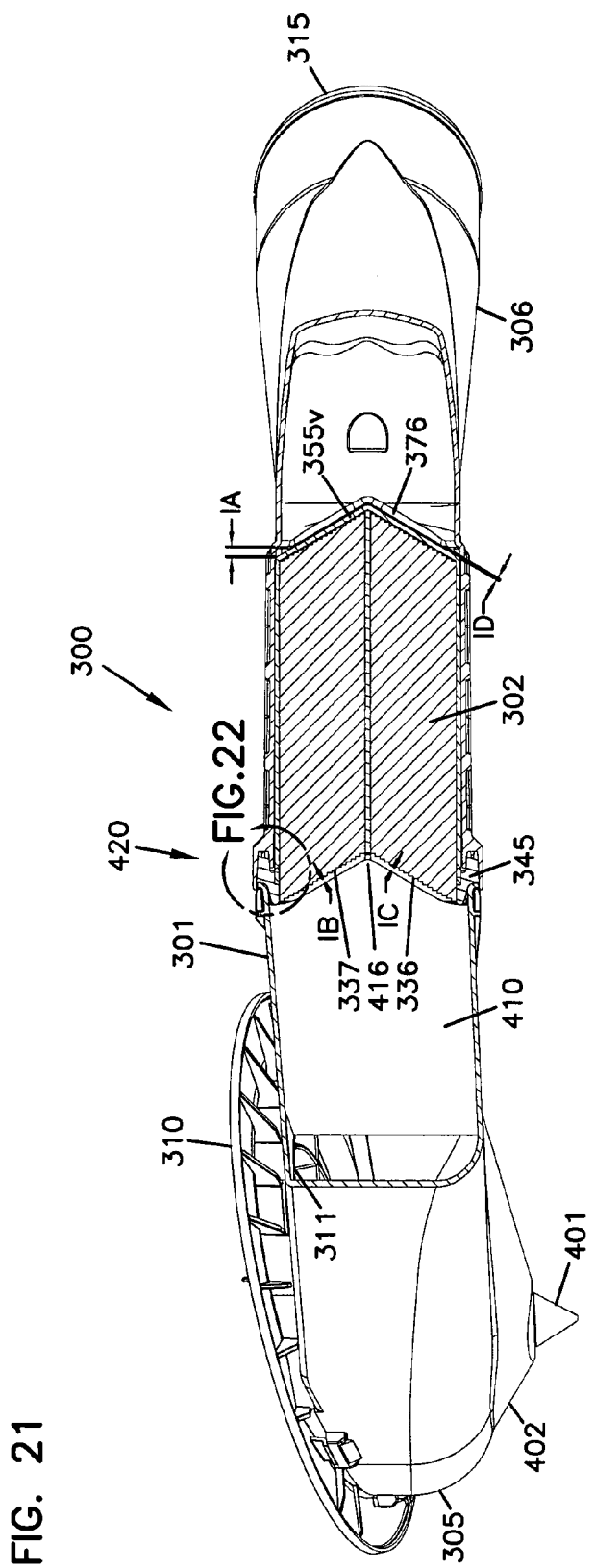
FIG. 21 is a schematic cross-sectional view taken along line 19-19, FIG. 18, depicting the filter cartridge of FIG. 10 in position.

Attention is now directed to FIG. 21. FIG. 21 is a view analogous to FIG. 19, except depicting cartridge 302 in position. Referring to FIG. 21 the following general features can be viewed: apex 416 of flange 410 projecting into central recess 337 of inlet face 336 (of cartridge 302); housing seal member 345 on cartridge 302 compressed between sections 305, 306 at region 420; and, v-shaped projection 355v at outlet end of cartridge 302 engaging v-shaped receiver 376, for stabilization.

Figure 22:
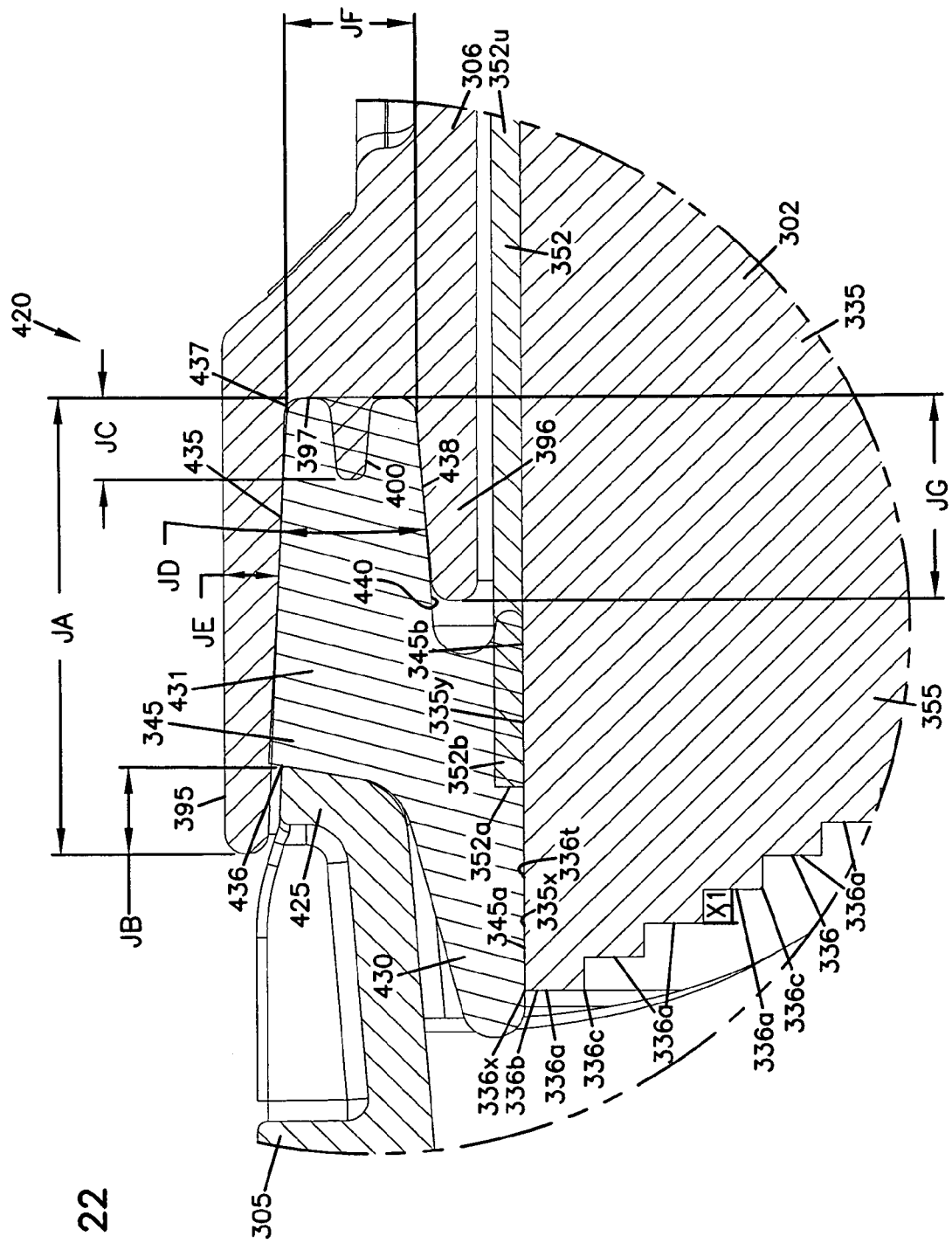
FIG. 22 is a schematic, enlarged, fragmentary view of a portion of FIG. 21.

Attention is now directed to FIG. 22. In FIG. 22, an enlarged fragmentary view of a portion of FIG. 21 is shown. The portion of FIG. 21 depicted in FIG. 22, is a region of engagement 420 between and among inlet section 305 and outlet section 306, with cartridge 302 in place. In particular, in FIG. 22, sealing engagement involving housing seal arrangement 345 is depicted.

Referring to FIG. 22, it is noted that stacked z-filter media pack 335, in particular stacked section 335a, is depicted schematically. First, in this instance, inlet face 336 is viewable, with each of several single facer strip layers 336a schematically depicted. Each of the strips or layers 336a is stepped in recess relative to an adjacent outer layer from an uppermost (or outermost) layer 336b in steps toward central region 337, FIG. 9. Each strip 336a of single facing material, as discussed previously, would comprise a fluted sheet secured to a facing sheet. For a media pack such as media pack 335, for uppermost (outermost) layer 336b, the single facer sheet would be positioned on the outside or top 336t. (Construction of the media pack 335 is discussed in greater detail below.) The amount of recess, dimension X1, for each step is typically within the range of 0.5 to 2 mm, although alternatives are possible.

Herein, a surface defined by the individual ends 336a, will generally be referred to as "slanted, planar." By this it is meant that the individual steps of dimension X1 are disregarded when the characterization is used, and the referenced plane is defined by the corner edges 336c of the various steps, or in an analogous manner.

At 352u a portion of screen member 352 is depicted. It is noted that screen member 352 stops short of tip 336x, of top layer 336t on which it is positioned. Typically end 352a of screen 352 is recessed from tip 336x a distance of at least 4 mm, usually at least 6 mm and often within the range of 6 mm to 15 mm, although alternatives are possible.

For the example arrangement shown in FIG. 22, housing seal arrangement 345 is molded-in-place with region 345a directly engaging the media pack 335 at section 335x; and with section 345b engaging the media pack 335 at region 335y with a portion 352b of screen 352 therein. Screen 352 is typically an open mesh, so that, during molding, portions of the material to form housing seal arrangement 345 can flow through the mesh, to directly engage the media pack 335.

Portions of the housing seal arrangement 345 which engage the media pack at regions 335x, 335y, forming sections 345a, 345b, comprise a part of base 430 of the housing seal arrangement 345. The base 430 is a portion of housing seal arrangement 345 which secures housing sealing compression portion, member or region 431 on or in the cartridge 302.

Still referring to FIG. 22 the housing seal compression portion 431 includes an outer annular surface 435 extending between ends 436, 437. End 436 is sized and positioned to be engaged by pressure flange 425 on housing section 305. End 437 is sized and positioned to be directed toward base 397 of section 306, with rib 400 pressing into the seal member 431. Typically outer edge 435 tapers inwardly in extension from end 436 to end 437, for example at an angle of at least about 1° typically at least about 1.5° and usually within the range of 1.5° to 4°, although alternatives are possible. Typically outer edge 435 and opposite inner edge 438 converge toward one another, in extension away from inlet face 336 toward outlet face 339, typically at an angle of at least 4°, usually at least 5° and often within the range of 5° to 8°, although alternatives are possible. Thus, in a typical arrangement, outer edge 435 tapers inwardly, and inner edge 438 tapers outwardly, in extension away from end 436 toward end 437.

It is noted that the housing seal member 345 is positioned such that housing seal compression portion 431 is supported by base 430 an amount defining a receiver space 440, between part of portion 431 and media pack 335 into which wall section 396 can project.

Referring still to FIG. 22, primary sealing will occur between projection 400 and compression member 345. In addition, distortion of compression member 345 will provide for additional sealing between the compression member 345 and side walls 395, 396. Of course some sealing will occur between compression 425 and compression seal member 345.

Attention is now directed to FIG. 10. Referring to FIG. 10, when cartridge 302 is positioned for flow to enter face 336, once the flow passes through face 336, some flow can exit downstream of seal arrangement 345 in any of a variety of ways including: through outlet face 339; through surface 338u; or, through surface 338l. Further, flow can exit the media pack sections 335a, 335b, toward center piece 350, when the stack 335a, 335b are configured so that fluted surfaces thereof are adjacent the center piece 460; and, when sealing between 335a, 335b is, as described below, adjacent face 336. Flow can pass both through screen 352, and along the flow paths under screen 352, due to the construction of screen 332 from a bi-planar arrangement, as discussed below.

E. Components and Assembly of Cartridge 302, FIGS. 23-35

The general features of cartridge 302 were discussed above, in connection with the description of FIGS. 10-14. In this section, assembly and componentry for the cartridge 302 are discussed.

Figure 23:
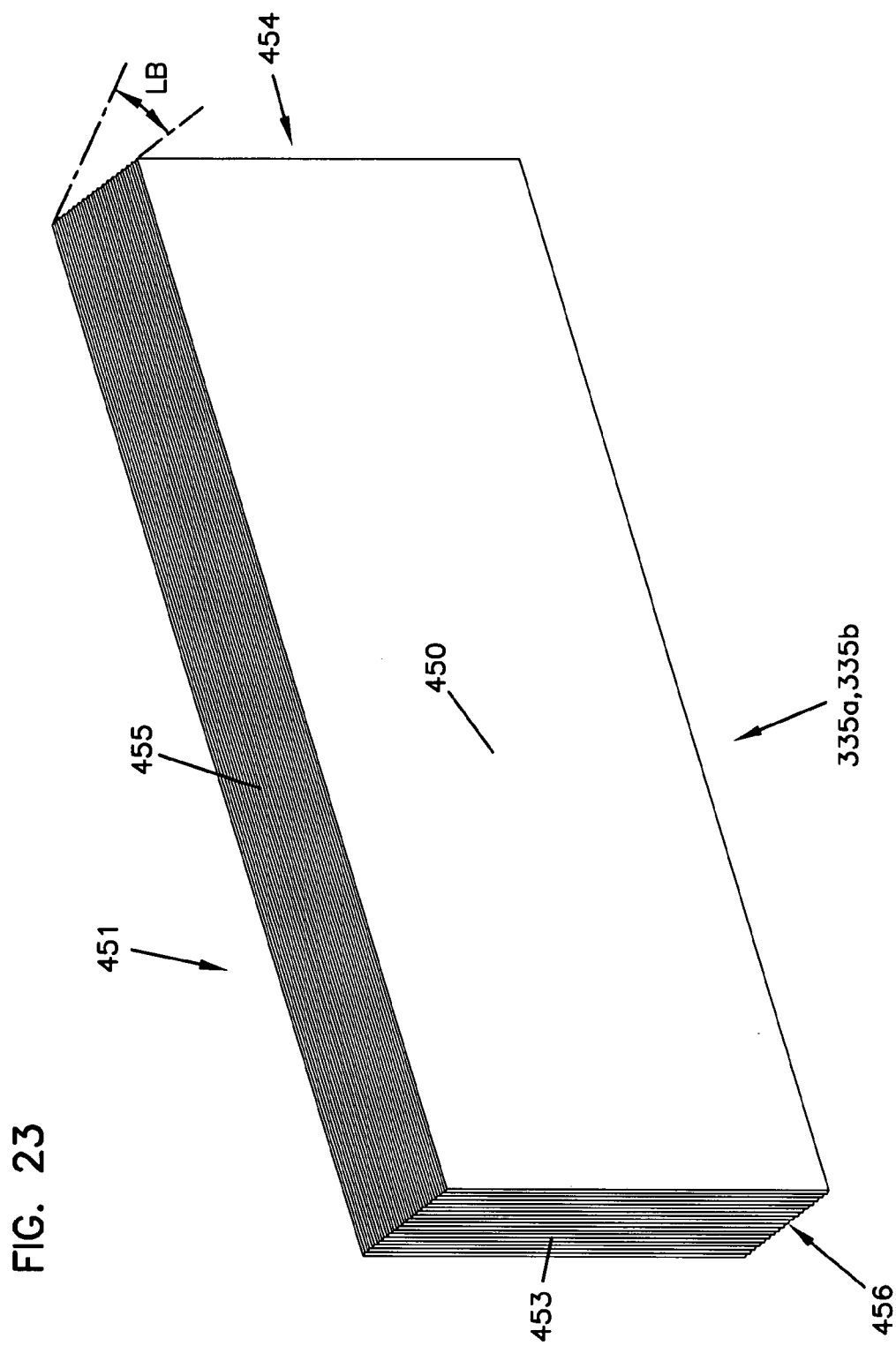
FIG. 23 is a schematic perspective view of a media pack section or component useable to form an air filter cartridge in accord with FIG. 10.

As previously referenced, the typical cartridge 302 will comprise a stacked media pack arrangement 335, comprising two media pack sections 335a, 335b. For the particular example shown, the media pack sections 335a, 335b are slanted stack sections, identical to one another, mounted as mirror images within the cartridge 302, although alternatives are possible. In FIGS. 23-25, an example one of the media pack sections 335a, 335b is depicted.

Referring first to FIG. 23, a schematic perspective view of one of the stacked sections 335a, 335b is depicted. The media sections 335a, 335b have opposite sides 450, 451; opposite side ends 453, 454; and, opposite flow faces 455, 456.

One of sides 450, 451, will typically comprise a first facing sheet of a single facer strip, with the opposite one of sides 450, 451 comprising a fluted (typically corrugated) sheet at an opposite side of the stack from the first facing sheet. Side ends 453, 454, comprise ends of single facer strips used to form the media stack sections 335a, 335b. Side ends 453, 454 generally include locations where: individual strips adjoin one another; and, edges between layers (fluted and facing) of individual single facer strips are located. Typically these ends and edges need to be sealed closed in cartridge 302. This is typically accomplished, as discussed below, by end pieces 355.

One of faces 455, 456 will comprise an inlet flow or face section for one of the media stack sections 335a, 335b, and thus a portion of the inlet face 336 for cartridge 302. The opposite one of faces 455, 456 will comprise an opposite outlet flow face or section.

For the example shown, the two media pack stacks 335a, 335b, would typically be oriented in cartridge 302 so that a facing sheet is directed toward both the top and the bottom sides of cartridge 302, i.e., toward sides 338u and side 338l, FIG. 10.

For the remainder of the description of FIGS. 23-25, it will be assumed that the example media stack 335a, 335b is 335a, FIG. 10. Thus, it will be described as oriented appropriately for that formation. For the example shown, a reverse or mirror image positioning to stack section 335a, would be appropriate for forming segment or section 335b, in cartridge 302, FIG. 10.

Referring to FIG. 24, slanted stack section 335a is oriented for positioning in cartridge 302. Section 335a is viewed schematically in FIG. 24. Here surface 455 is oriented as an inlet flow face and surface 456 is an outlet flow faces. Side 451 will, in the cartridge, form a portion of upper surface 338u. Surface 451 is typically bordered by facing sheet, as opposed to fluted sheet, although alternatives are possible. Opposite surface 450 typically comprises an exposed fluted sheet of a single facer strip, although alternatives are possible.

Referring still to FIG. 24, stack 335a comprises a slanted stack of single facer strips, each offset or recessed downstream or toward outlet face 456 relative to an adjacent (above or outer) one in a direction from surface 455 toward surface 456. In a slanted stack such as stack 335a, along surface 455, offset single facers, generally define an inlet face 455 extending at a angle of recess, angle LB, FIG. 24, relative to a plane perpendicular to surfaces 451, 450. Angle LB for slanted stack arrangement, will typically be at least 20°, typically at least 25°, usually not more than 80° and often within the range of 30° to 60°, inclusive, although alternatives are possible. Angle LB is an angle between a plane approximating the first, in this instance inlet, face 455 of a slanted stack such as stack 335a, and a plane perpendicular to a longitudinal extension of flutes between inlet face 455 and outlet face 456. Still referring to FIG. 24, angle BL, typically a compliment to angle LB, will sometimes be referred to as the internal acute "slant angle" of the slanted media stack. The internal acute slant angle is the smallest internal angle for the slanted stack, in side view or cross section. Angle BL is typically at least 20° often at least 25° and usually within the range of 25° to 80°, inclusive, although alternatives are possible.

Referring to FIG. 24, horizontal lines indicate adjacent single facer strips. The depiction is schematic, the lines are not meant to specifically indicate a number of single facer strips in any given construction, which is a matter of design choice.

In FIG. 25, an end view taken toward surface 455 is provided. One can also see a schematic depiction of the various layers of single facer strips 457, represented by horizontal lines.

The media pack 335 of cartridge 302 can be formed, in part, by positioning stack 335a as shown in FIG. 24, with a second stack, in this instance a mirror image stack 335b positioned on an opposite side of a central piece 460 of FIG. 10, indicated generally at 350, FIG. 12. An example central piece 460 is depicted in FIG. 26.

Figure 26:
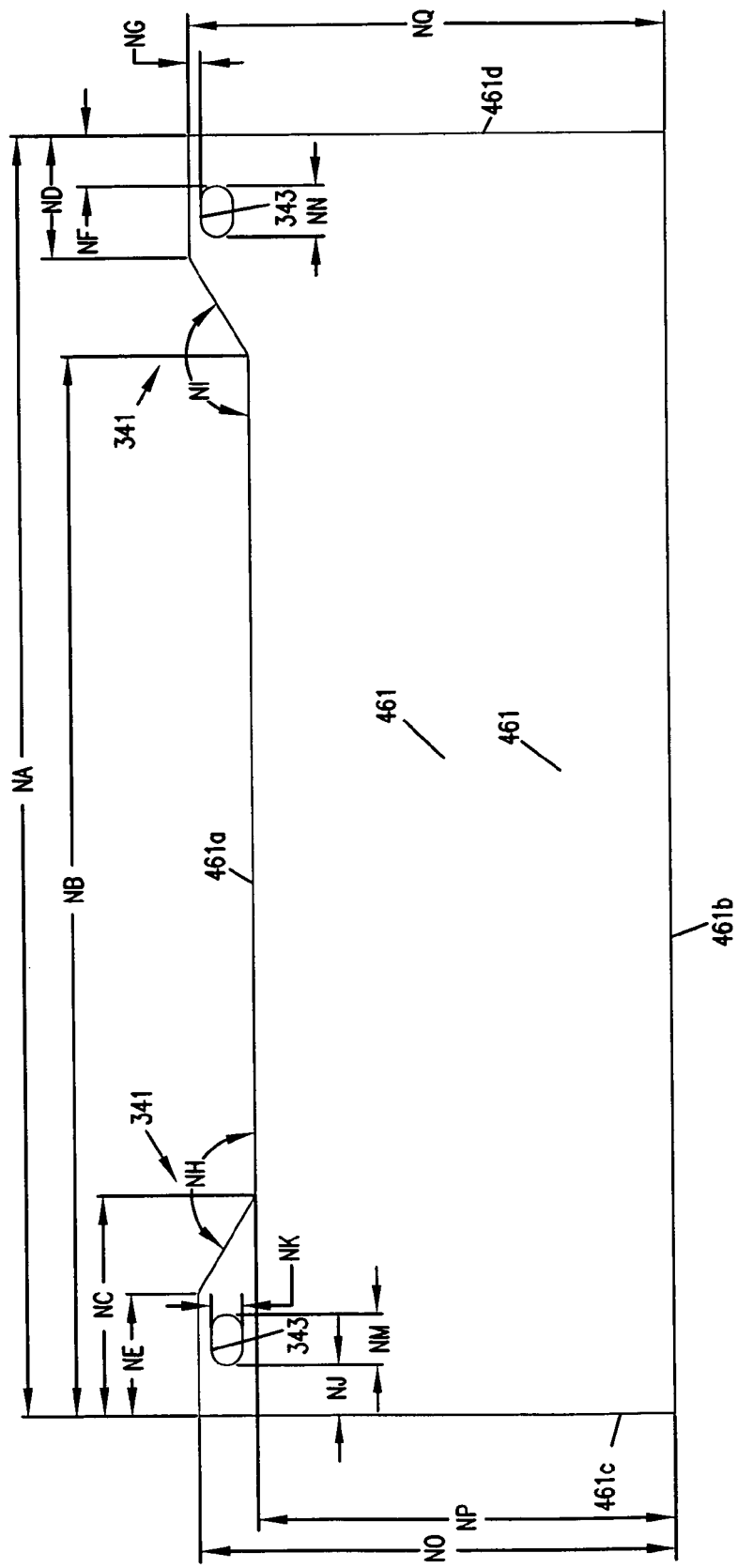
FIG. 26 is a plan view of a center piece component, useable to form the filter cartridge of FIG. 10.

Referring to FIG. 26, for the example shown, the central piece 460 comprises central divider member or portion 461 with handle arrangement 341 thereon. The example divider member or portion 461 shown is generally a flat featureless portion which is positioned between stacked sections 335a, 335b, in the cartridge 302. Typically, a divider member or portion 461 is solid and continuous, without apertures therethrough, between front edge 461a, rear edge 461b, and sides 461c, 461d. That is, typically and preferably the only apertures in central piece 460 are positioned in handle arrangement 341, see aperture arrangements 343, and are not positioned in divider member or portion 461. The example divider member or portion 461 depicted is rectangular, as will be typical although alternatives are possible.

The center piece 460 can be made from a variety of materials. Typically they comprise a material which sealant is from the media pack and readily adhere. An example would be a pressed fiber hardboard, such as a eucalyptus fiber board, with resin binders therein. Alternatively, various plastics, for example nylon, can be used.

Figure 26A:
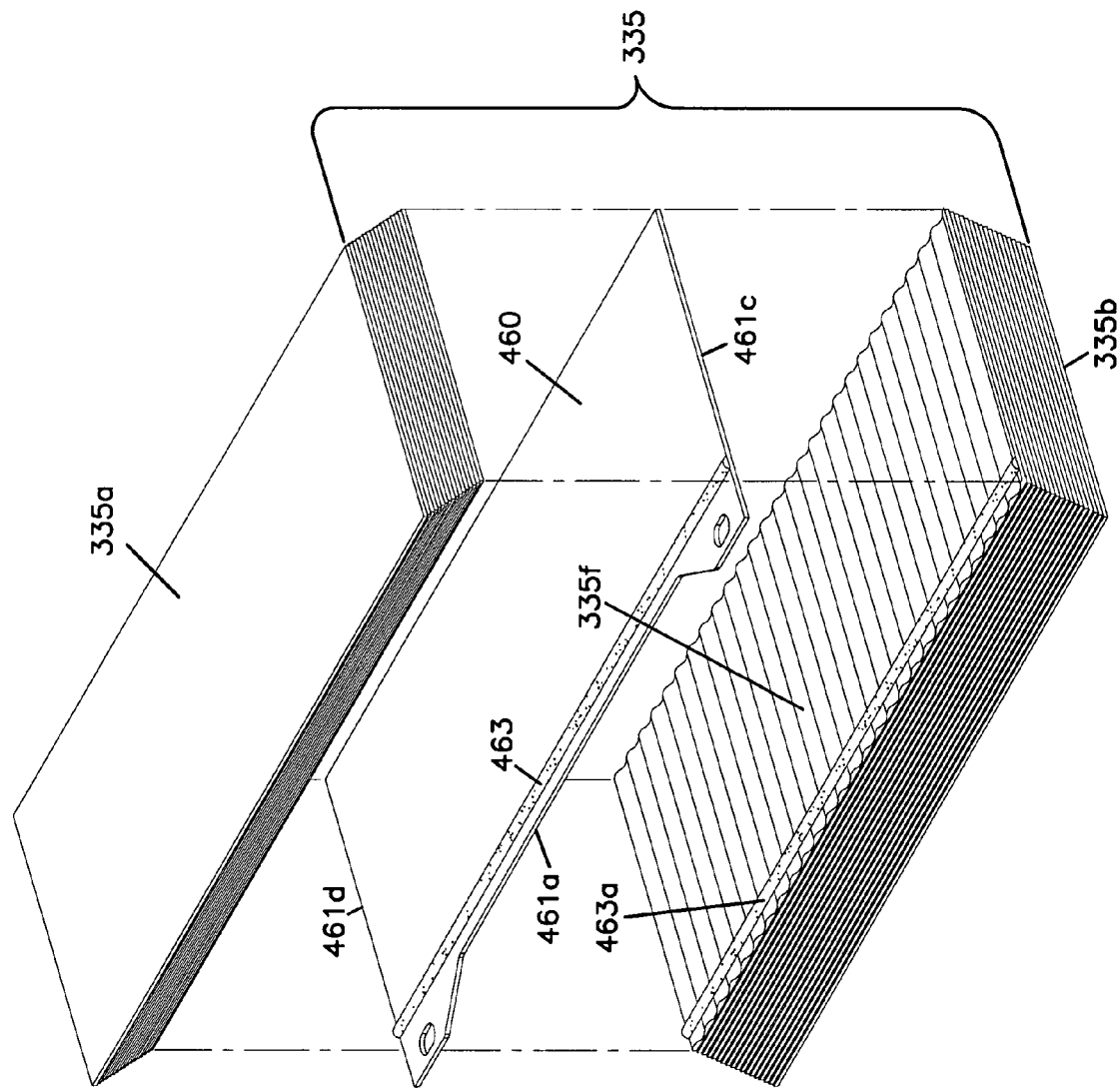
FIG. 26A is an exploded, schematic, depiction, in perspective view, of an intermediate component formed during assembly of the cartridge of FIG. 10.

Although alternatives are possible, sections 335a, 335b are typically secured to divider section 461 with a fluted face of each directed against divider section 461, on opposite sides of central piece 460, with sealing typically along an upstream edge of the media stacks 335a, 335b, i.e., adjacent or spaced slightly from upstream edge 461a of divider section 461. The securing is typically done such that handle arrangement 341 will project outwardly from an upstream face (e.g., face 336) of the resulting media pack assembly 335, FIG. 10, i.e., from cartridge 302 in a direction opposite downstream surface 339. With respect to this, attention is directed to FIG. 26A, in which in an exploded view, media stacks 335a, 335b are shown positioned on opposite sides of center piece 460. Sealant bead 463 is shown positioned in extension between edges 461 and 461d, at a region adjacent to or slightly spaced from front edge 461a. A corrugated surface of stack 335a, would typically be positioned in sealing engagement with bead 463. It is noted that in some methods of assembly, the bead 463 may be applied to the media stack 335a, as opposed to the center piece 460, during assembly. This is shown for bead 463a on fluted surface 335f of stack 335b. The result is a subassembly comprising media pack 335.

In a next step of assembly, the screen member 352 is positioned over the assembly 335 comprising stacked sections 335a, 335b, and center piece 460. The screen member 352 is depicted schematically in FIGS. 27-30. Typically, the screen member 352 is formed from a single continuous sheet of screen, formed into the desired shape. This shaping can be done by scoring and folding, or through other techniques.

Figure 27:
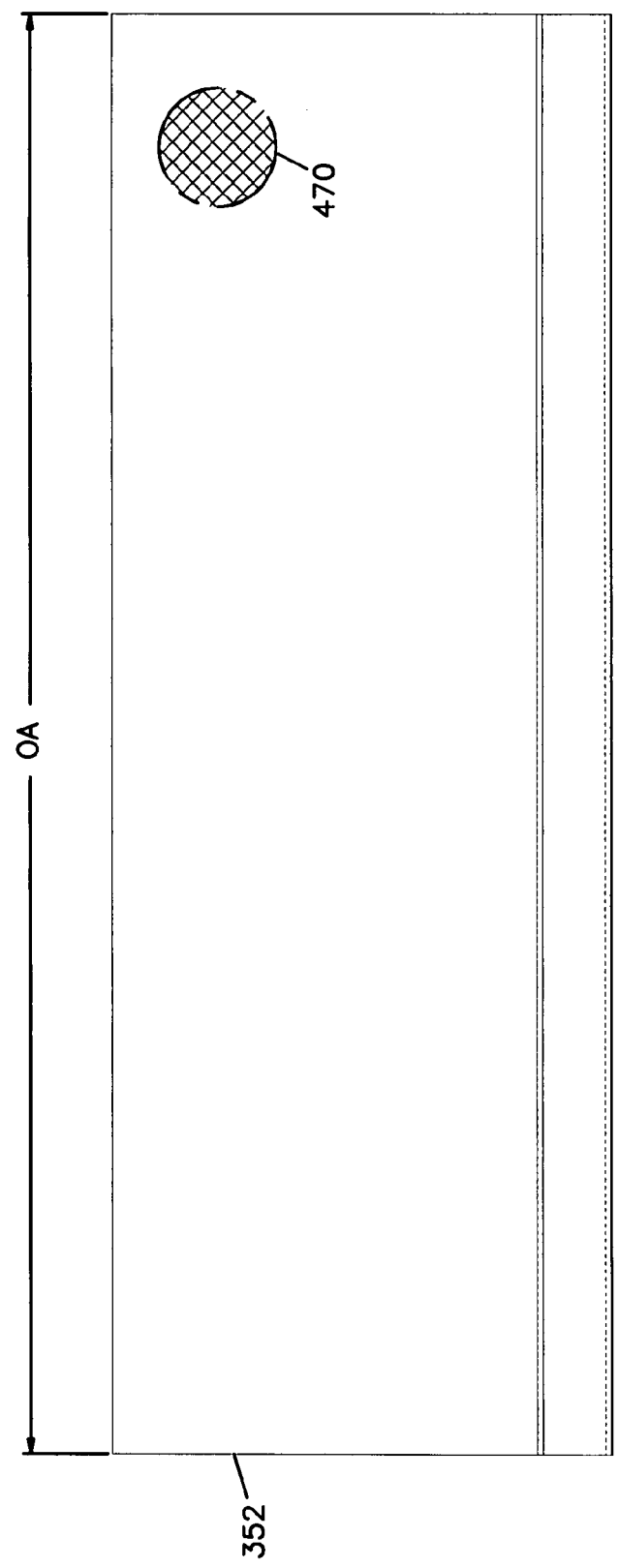
FIG. 27 is a schematic top plan view of a screen component useable to form the cartridge of FIG. 10.
Figure 29:
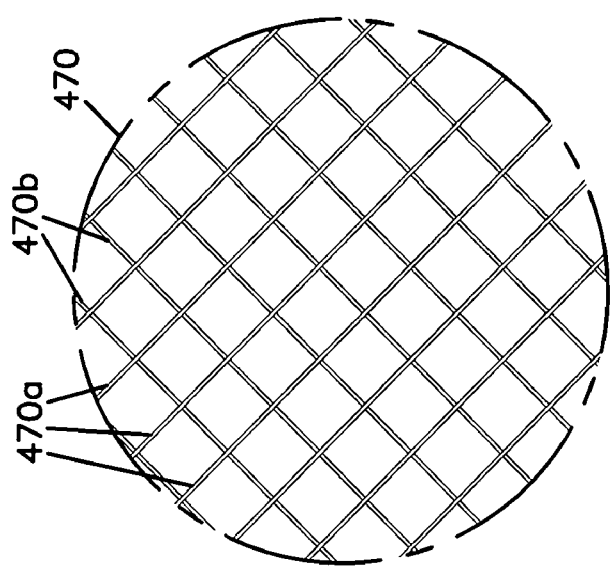
FIG. 29 is an enlarged, schematic, view depicting mesh of the screen depicted in FIG. 27.

Referring first to FIG. 27, screen member 352 is depicted in top plan view. In FIG. 29, a mesh portion 470 of screen member 350 is viewable, to see the various cross-hatched lines 470a, 470b of the mesh 470. For the typical screen member 350, the mesh is a bi-planar mesh, with all parallel strands 470a in a first direction in one plane, and all parallel strands 470b in the mesh in a second direction in an adjacent plane. This is depicted in the cross-section of FIG. 30, in which strands 470a are shown in one plane and strands 470b are shown in another plane.

Figure 28:
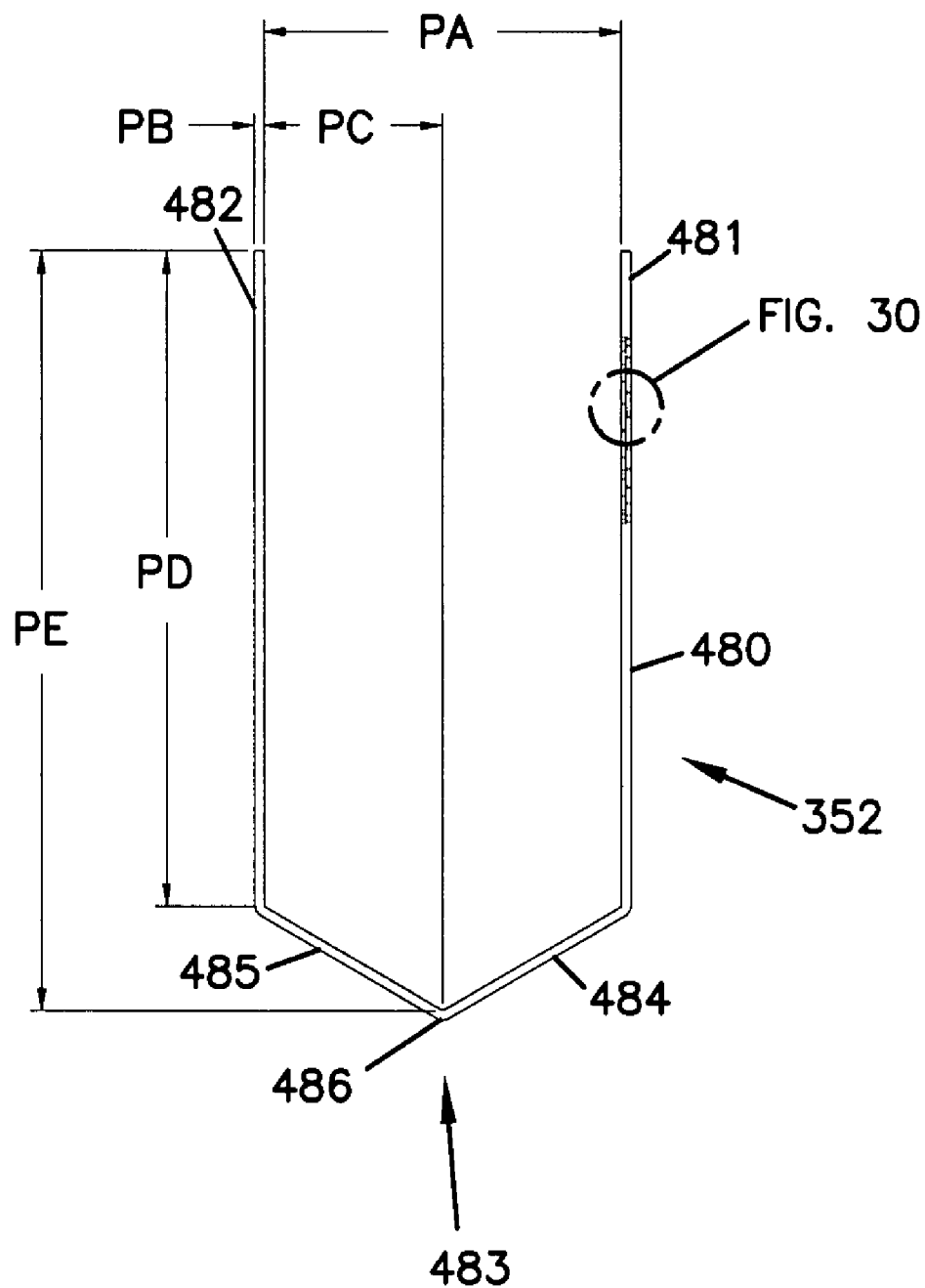
FIG. 28 is a schematic side end elevational view of the screen component of FIG. 27.
Figure 30:
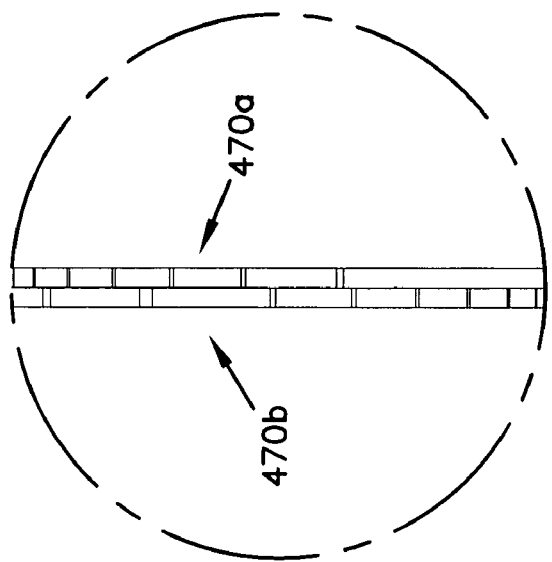
FIG. 30 is an enlarged fragmentary cross-sectional view of a portion of FIG. 28.

Referring to FIG. 28, and before installation on the assembly 469 comprising the stacks 335a, 335b and centerpiece 460, the screen 352 is typically preformed into the outer surface shape (minus inlet surface) of the cartridge 302. In FIG. 28, then, screen member 352 is shown formed or shaped into a member 480 having opposite side surfaces 481, 482, and end v-shaped surface 483 comprising sides 484, 485 on opposite sides of apex 486. It can be seen from a review of FIG. 28, that the assembly 335, FIG. 26A, comprising stacks 335a, 335b and center piece 460 can then be positioned into screen 350, between surfaces 481, 482.

A later step in the process of forming cartridge 302, is forming end pieces 355, FIG. 10. The end pieces 355 will typically be molded-in-place, securing the screen 350 to the assembly 469 comprising media sections 335a, 335b and the center piece 460.

For a typical arrangement, the opposite end pieces 355 will be identical, and be positioned as mirror images of one another. Also, typically they will be molded-in-place, comprising a urethane foam. A typical urethane foam useable, will be the same material as that used for the housing seal arrangement 345, discussed below. However, there is no specific requirement the same material be used for the end pieces 355, as is used for the housing seal arrangement 345.

Figure 31:
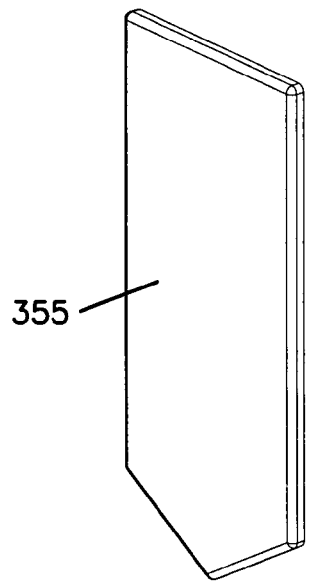
FIG. 31 is a schematic, perspective, view of a molded side panel component of the filter cartridge of FIG. 10.
Figure 32:
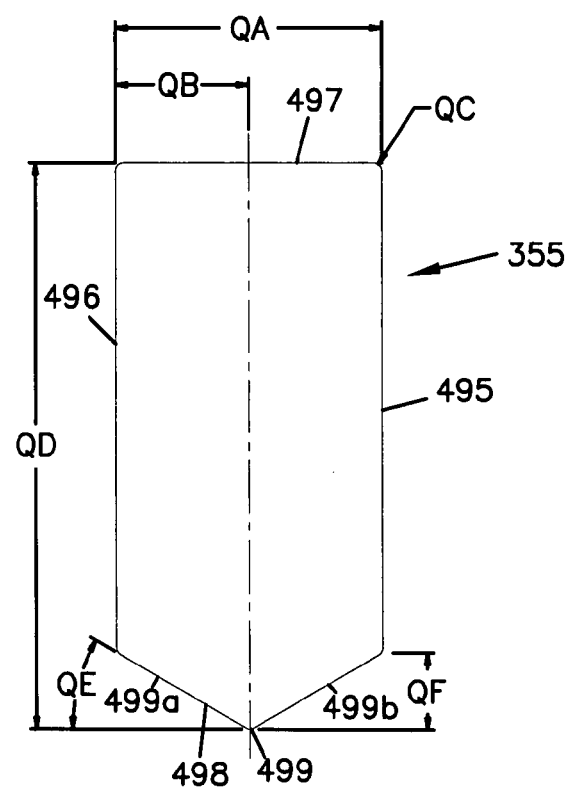
FIG. 32 is a schematic plan view of the side panel component of FIG. 31.

In FIG. 31, one of the end pieces 355, is depicted in perspective view. In FIG. 32 a plan view is shown, to provide example dimensions. It will be understood that since the end pieces 355 are typically molded-in-place, they are not preformed and viewable as the components depicted in FIGS. 31-32, rather a mold would be formed, with a mold cavity having a shape defining the end pieces shown. The end pieces would then be a molded-in-place, by inserting an appropriate side edge of a media pack assembly comprising: the stacks 335a, 335b, the center board 460, and the screen 350, into the mold and resin. In a typical assembly process, one side 355 at a time will be formed, in a cartridge 302. After molding of a first end piece 355, the resulting partially formed media pack could then be inverted and reinserted into the same mold, with more polymeric material, to form the opposite one of end pieces 355.

Referring still to FIG. 32, each the side pieces 355, for the example shown, comprises opposite upper and lower edges 495, 496, which generally extend parallel to one another; and, front or inlet edge 497 which, generally, for the example shown, extends perpendicularly to top and bottom edges 495, 496. Opposite inlet edge 497 is outlet edge 498 with a v-shape having apex 499 and side sections 499a, 499b.

A later step in the preparation of cartridge 302, is formation of the housing seal arrangement 345. The housing seal arrangement is typically molded-in-place, in extension around the subassembly comprising: the two stacks 335a, 335b, the center piece 460, the screen 350 and the end pieces 355. The housing seal arrangement 345 would typically be molded-in-place from a polyurethane material, for example a foam polyurethane material. In typical applications it would be molded to an as molded density of not greater than 30 lbs/cu.ft. (0.46 g/cc), typically not greater than 15 lbs/cu.ft (0.24 g/cc), and sometimes no greater than 10 lbs/cu.ft (0.16 g/cc). The overall resulting material would typically be formed with a hardness, shore A, of no greater than 30, typically no greater than 25 and often within the range of 12-20. It is noted that in some applications alternate densities and hardnesses can be used. However, the ranges stated will be typical, for many applications.

Figure 33:
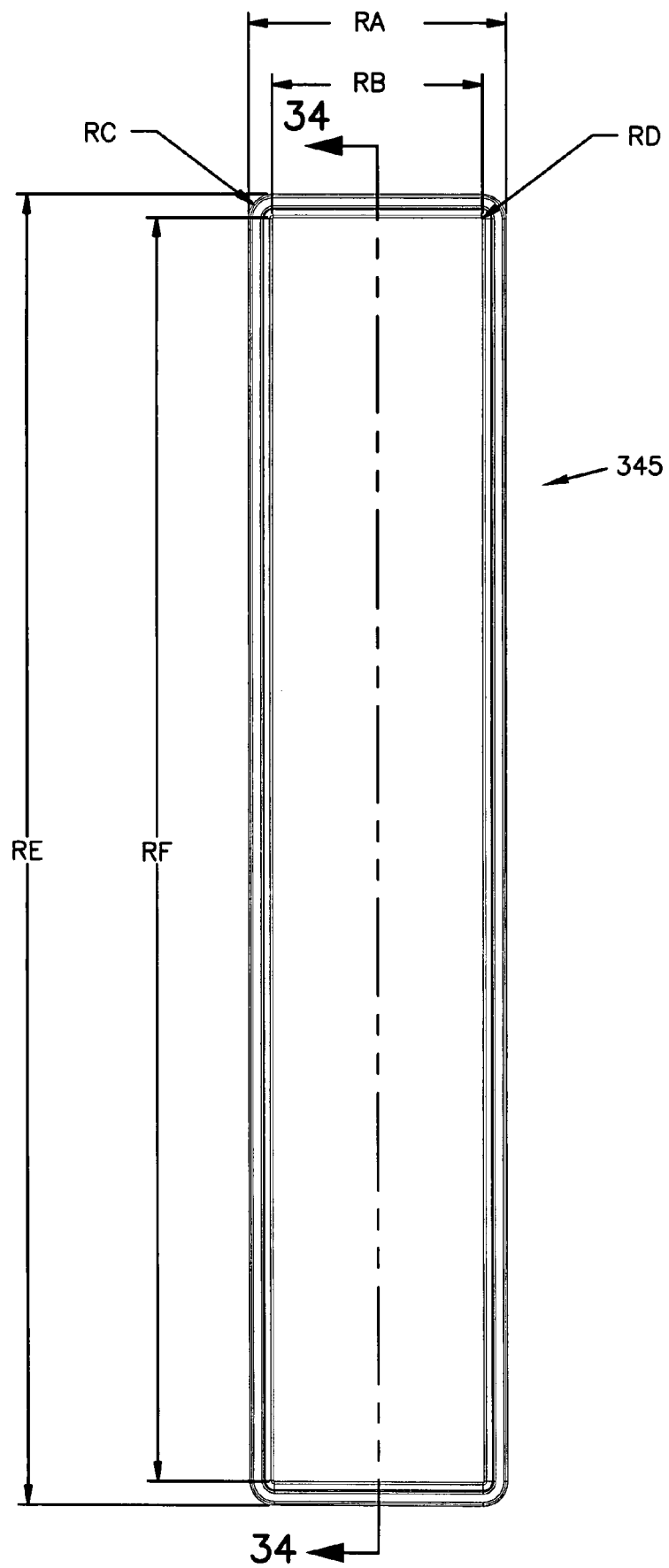
FIG. 33 is a schematic plan view of a housing seal component of the cartridge of FIG. 10.

In FIG. 33, a plan view of housing seal arrangement 345 is depicted. It should be understood that housing seal arrangement 345 would typically not be formed as a separate piece. Rather, a mold cavity would be formed appropriate to generate the shape of housing seal arrangement 345. A subassembly 500 comprising: the two stacks 335a, 335b; the centerpiece 460; the screen 352; and, the end pieces 355 would then be inserted into the mold cavity, at an appropriate location for positioning of the housing seal arrangement 344 as pictured in FIG. 10. Resin within the mold cavity, would then form the seal arrangement 345.

Figure 34:
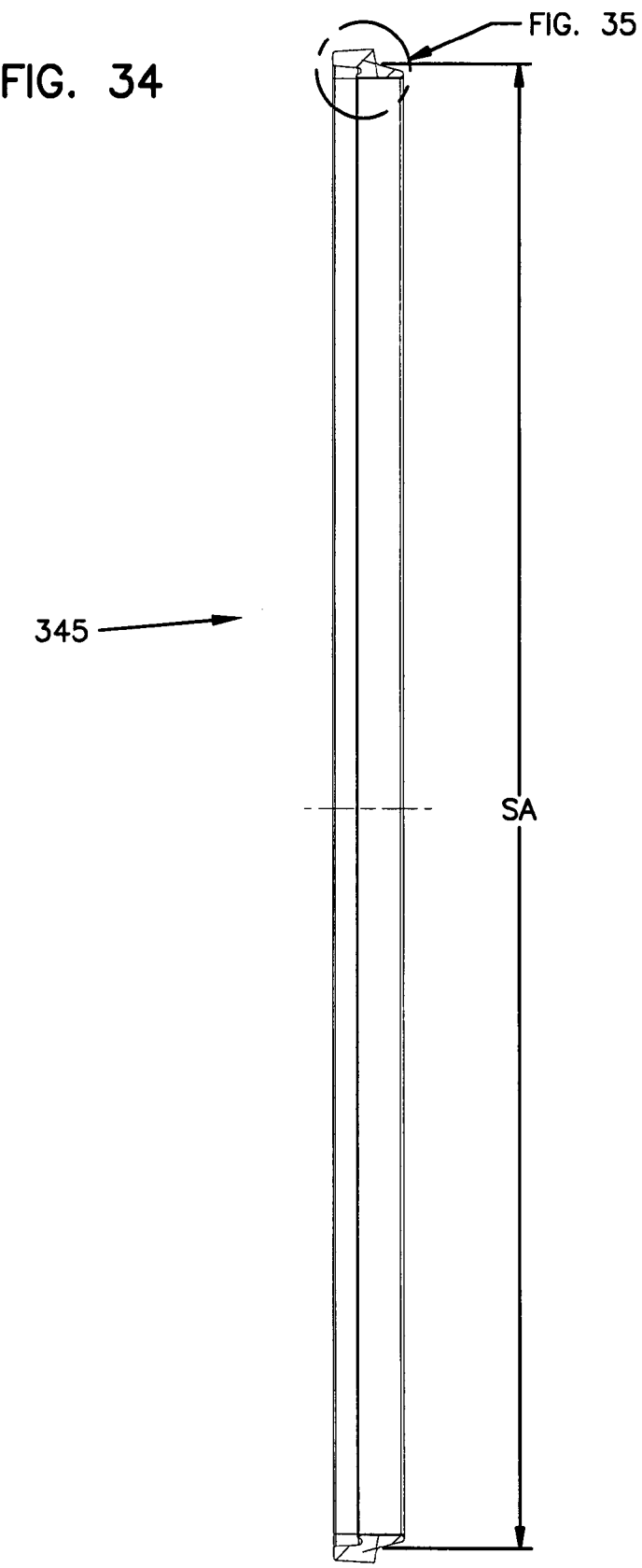
FIG. 34 is a cross-sectional view taken along line 34-34, FIG. 33.
Figure 35:
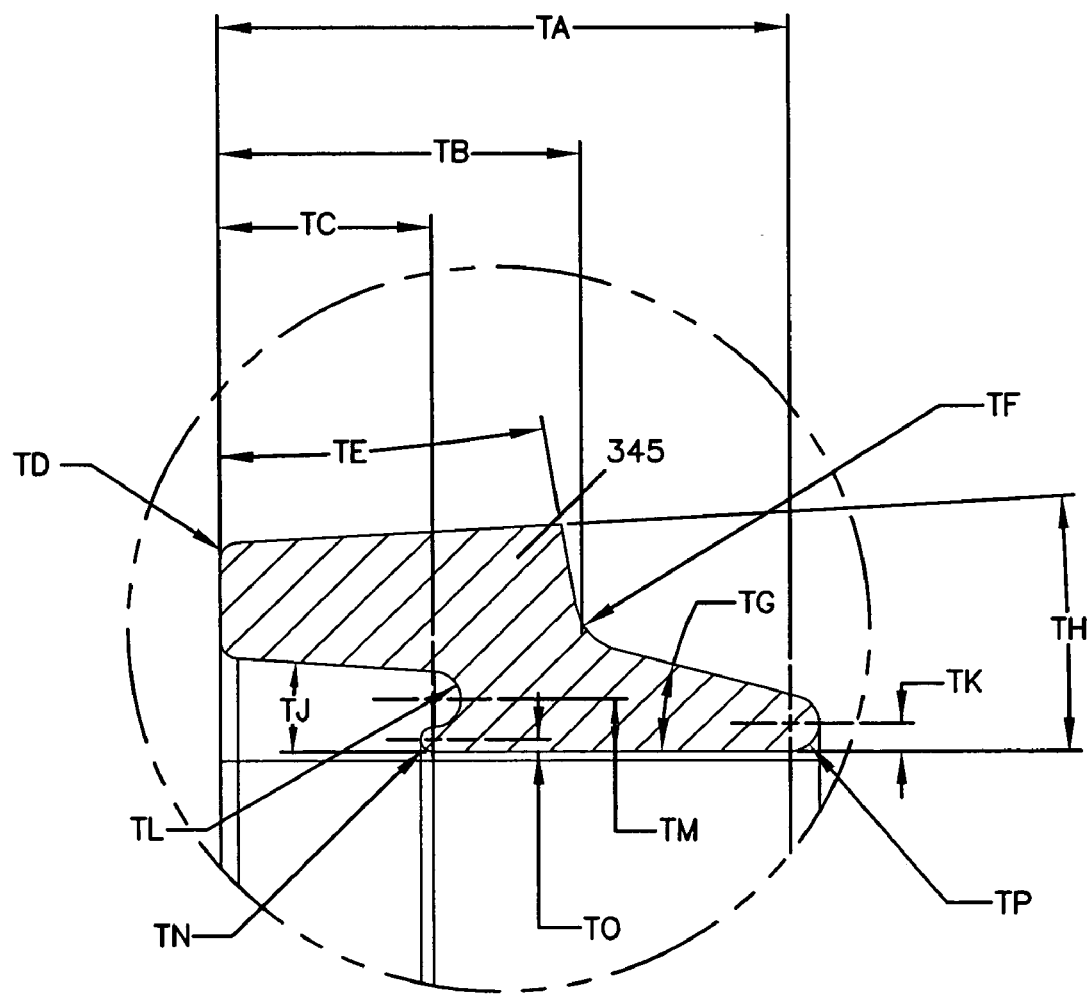
FIG. 35 is an enlarged fragmentary view of a portion of FIG. 33.

In FIG. 34, a cross-sectional view of housing seal arrangement 345 is shown. In FIG. 35, an enlarged fragmentary view of a portion of FIG. 34 is depicted.

Figure 36:
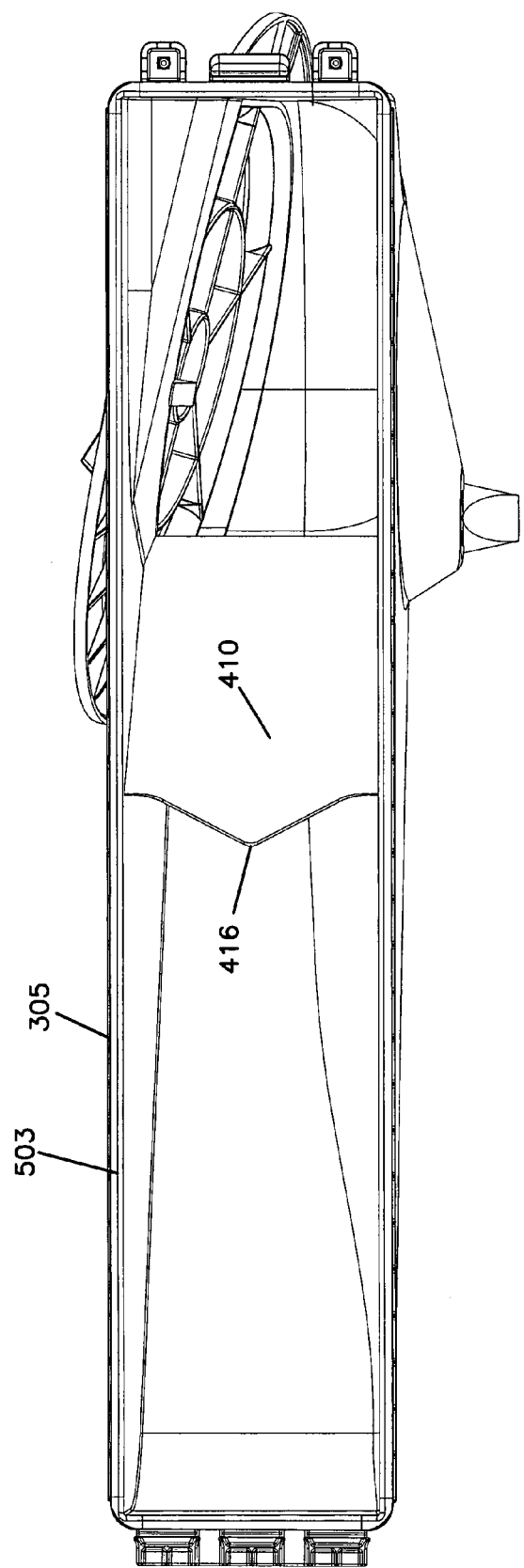
FIG. 36 is an end view taken toward an inside of an inlet component of the air cleaner depicted in FIG. 7.

In FIG. 36, a view directed into housing section 305 is provided. Vane 410 previously discussed, with apex 416 is readily viewable. It is noted that in FIG. 36, the vane 410 can be seen to be angled relative to perpendicular with respect to edge 503. Indeed, in the example shown, the plane of vane 410 is generally aligned with a line bisecting inlet aperture 311, and centrally positioned.

F. Dimensions for an Example Arrangement

In various ones of FIGS. 7-35, dimension lines and angles are indicated, for an example system. The dimension lines and angles indicate dimensions that would be specified for a given application of the principles described. Variations from the ones shown, can be used.

For the particular example depicted in FIGS. 7-35 would be appropriate, for example, for use with a class 8 heavy duty track. For this example, the dimensions indicated are as follows: FIG. 11 AA=634 mm; AB=105.6 mm; AC=132.8 mm and, AD=664.9 mm; in FIG. 13, BA=235.6 mm; BB=640.4 mm; in FIG. 12 CA=204.1 mm; CB=111.2 mm; CC=200 mm; in FIG. 14, DA=29.2 mm; DB=10.1 mm; DC=18.0 mm; in FIG. 16, FA=184.7 mm; FB=30°; and, FC=120°; in FIG. 17, EA=22.4 mm; EB=4 mm; EC=2° 30'; ED=6.3 mm; and EE=10.0 mm; in FIG. 19, HA=184.7 mm; HB=17.6 mm; HC=30°; HD=120°; and HE=120°; in FIG. 20, GA=22.4 mm; GB=4.3 mm; GC=4.0 mm; GD=2° 30'; GE=6.3 mm; and GF=10.0 mm. In FIG. 21, IA=6 mm; IB=3°; IC=3 mm; ID=0.9 mm; in FIG. 22, JA=24 mm; JB=4.3 mm; JC=4.0 mm; JD=6° 30'; JE=2° 30'; JF=6.3 mm; and JG=10 mm; in FIG. 24, LA=200 mm; LB=30°; and LC=227.9 mm; in FIG. 25, MA=634 mm; and MB=51.2 mm; in FIG. 26, NA=634 mm; NB=525.2 mm; NC=108.8 mm; ND=60.4 mm; NE=60.4 mm; NF=25 mm; NG=6.0 mm; NH=150°; NI=150°; NJ=25 mm; NK=15 mm; NM=25 mm; NN=25 mm; NO=229.5 mm; NP=201.6 mm; and NQ=229.5 mm. The thickness of piece 460 would typically be 3.2 mm. In FIG. 27, OA=633 mm; in FIG. 28, PA=105.6 mm; PB=2.8 mm; PC=52.7 mm; PD=190 mm; and PE=220.5 mm; in FIG. 32, QA=111.2 mm; QB=55.6 mm; QC=3 mm radius; QD=233.3 mm; QE=30°; and, QF=31.6 mm; in FIG. 33, RA=132.8 mm; RB=108.3 mm; RC=12.8 mm radius; RD=0.5 mm radius; RE=664.9 mm; and RF=640.4 mm; in FIG. 34, SA=652.3 mm; and in FIG. 35, TA=30 mm; TB=19.1 mm; TC=11.2 mm; TD=1 mm radius; TE=10°; TF=3 mm radius; TG=15°; TK=1.5 mm; TH=3.2°; TP=1.5 mm radius; TM=2.8 mm; TO=0.7 mm; TN=0.7 mm radius; TL=1.5 mm radius; and TJ=4°.

IV. An Alternate Example Cartridge FIGS. 37-39

Figure 37:
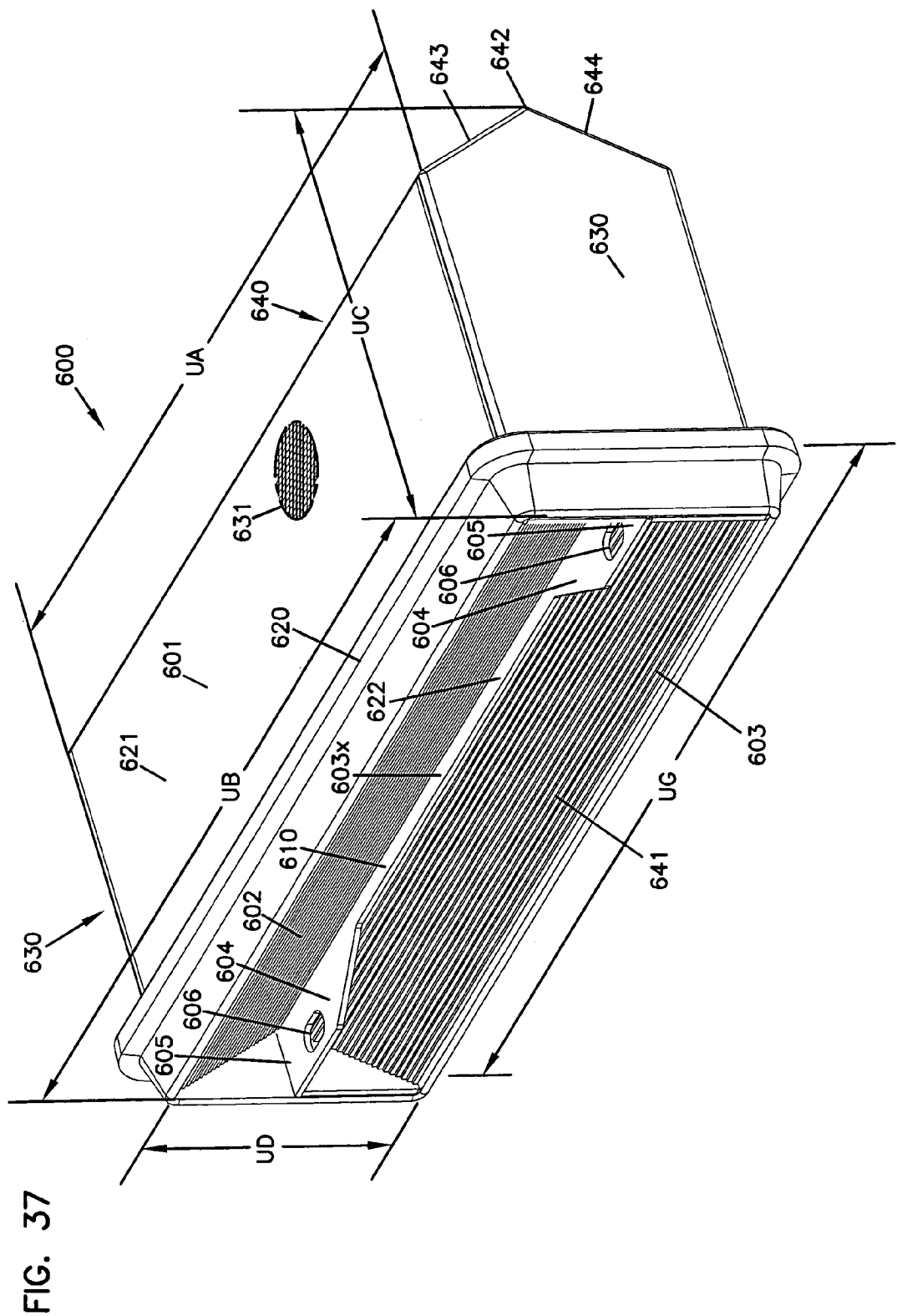
FIG. 37 is a schematic perspective view directed toward an inlet face of an alternate filter cartridge, to the one depicted in FIG. 10.
Figure 38:
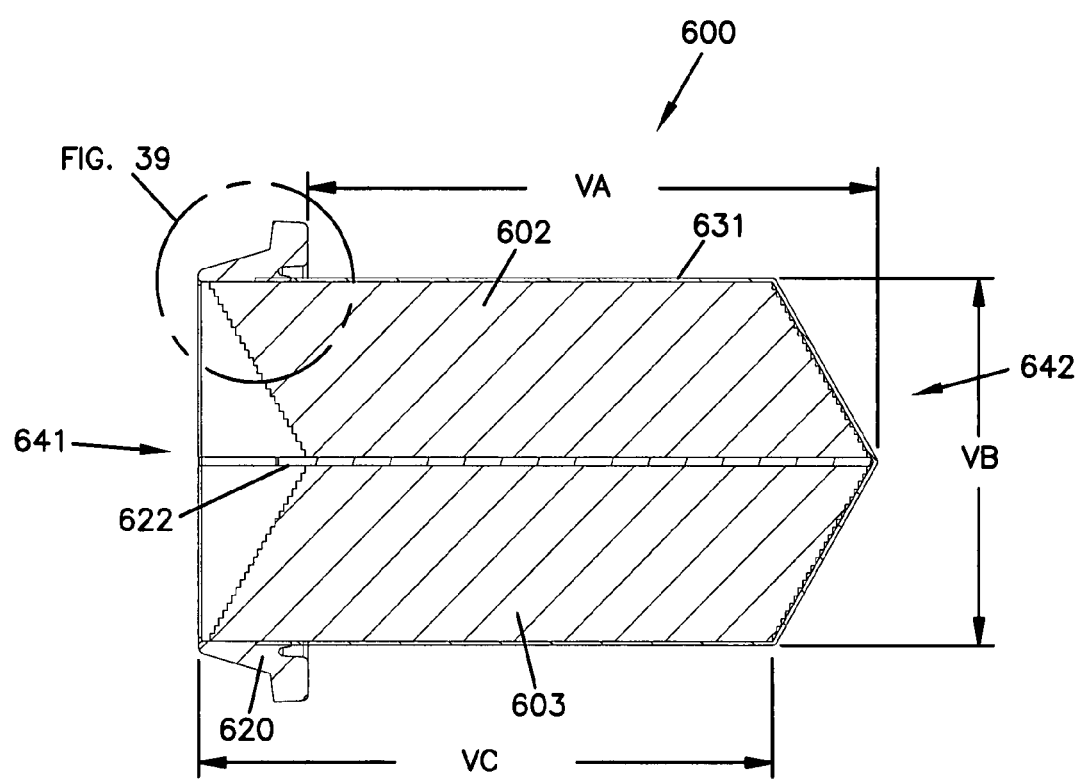
FIG. 38 is a schematic cross-sectional view of the cartridge depicted in FIG. 37.
Figure 39:
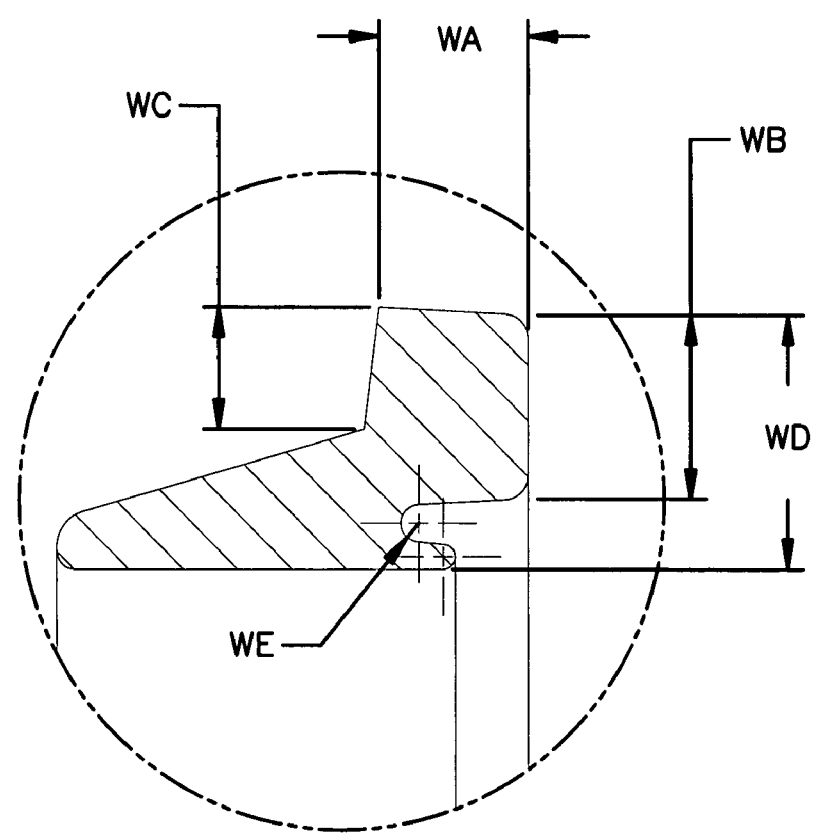
FIG. 39 is an enlarged fragmentary view of a portion of FIG. 38.

The principles described herein can be applied in a variety of shapes and sizes of filter cartridges. An example alternate cartridge, is depicted in FIGS. 37-39, at reference numeral 600. Of course an appropriately sized and shaped housing could be formed for receipt of the cartridge 600, to define an air cleaner arrangement. Referring first to FIG. 37, cartridge 600 comprises a stacked media pack arrangement 601 comprising slanted z-filter media single facer stacks 602, 603 mounted as mirror images of one another, around center piece 603x. The center piece 603x includes handle arrangement 604 comprising opposite handles 605 with finger aperture 606. The slanted stacked pack 602, 603 define a central recess region 610, with the handles 605, projecting outwardly therefrom in an upstream direction.

In FIGS. 37-39, the v-shaped recess 610 would typically define an internal v-angle of 50°-150°, inclusive, typically 80°-130°, inclusive. A same range definition is typical for the internal angle of the v-projection at an opposite end.

In FIGS. 37-39, dimensions are indicated as follows, for the example: In FIG. 37: UA=511 mm; UB=509 mm; UC=243.1 mm; UD=171.2 mm; UG=551.4 mm; In FIG. 38: VA=204.2 mm; VB=130.8 mm; and, VC=204 mm; and, in FIG. 39: WA=12.3 mm; WB=14.9 mm; WC=9.9 mm; WD=20.6 mm; and, WE=1.5 mm radius.

V. Potential Application with Opposite Flow Direction

It is noted that the example filter 302 depicted, is described in an environment in which the flow direction is such that the first face, with a recess therein, is an inlet flow face; and, the opposite face, with the projection thereon, is the outlet flow face. Principles according to the present description, can be provided in arrangements with an opposite flow direction; that is, with the inlet flow having a central apex extending thereacross; and, with the outlet flow from a flow face having a central recess therein. The cartridge could be made with similar features to those described, i.e., slanted media packs positioned on opposite sides of a center board, typically with fluted faces directed toward the center board; and, housing seal arrangement. Alternatively, the media pack can be positioned without a center piece therebetween. Variations and location of the housing seal arrangement on the cartridge, and locations of seals between the stacked media pack sections in the center board, can be made from the designs described previously, to manage air flow issues and for convenience.

VI. Application of Selected Principles in an Alternate Air Cleaner Assembly or Arrangement Selected principles described herein above, can be utilized in a variety of alternate arrangements. An example is indicated in FIGS. 40-42.

Figure 40:
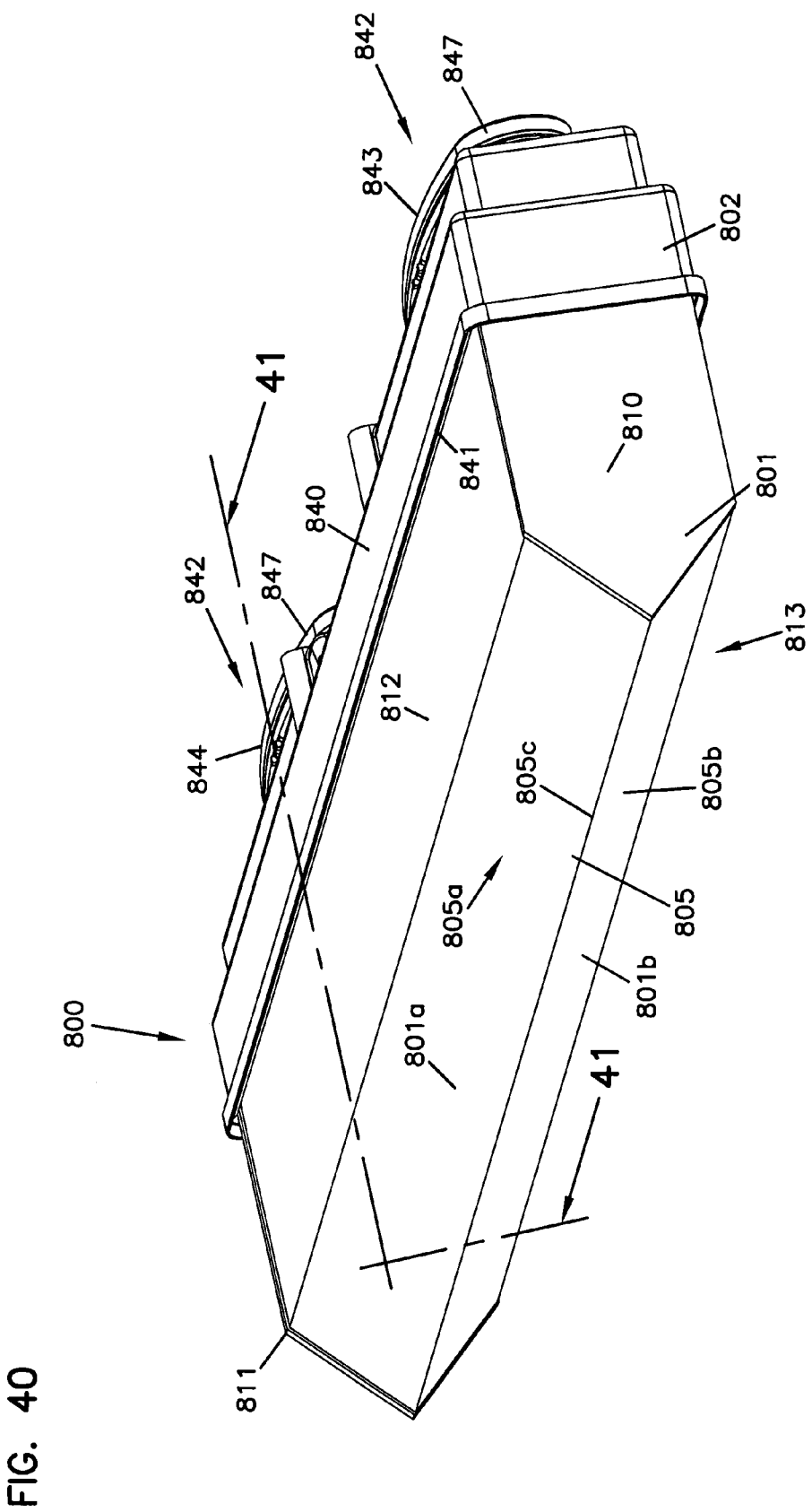
FIG. 40 is a schematic perspective view of an alternate air cleaner arrangement including a media pack assembly in accord with selected principles described herein.

Referring first to FIG. 40, an air cleaner arrangement 800 is depicted. The air cleaner arrangement comprises a media pack arrangement 801 and a preform section 802. It will be understood from descriptions below, for the particular example shown, in assembly media pack arrangement 801 is permanently secured to preform outlet 802, for example an adhesive, i.e., adhesively secured, forming a permanent seal between the two.

Still referring to FIG. 40, for the air cleaner arrangement 800 shown, flow face 805, in media pack arrangement 801 would generally comprise a first, in this instance inlet face for air flowing into the air cleaner arrangement 800, to be filtered. The inlet face 805 comprises two sections 805a, 805b slanted in directions away from one another around a central apex 805c. Faces 805a, 805b can comprise slanted surfaces of media stacks of single facer strips, adhered or secured adjacent one another, as described below.

Still referring to FIG. 40, media pack arrangement includes opposite side pieces 810, 811 typically molded-in-place, secured to ends of stacks 801a, 801b of media strips. The media pack arrangement 801 also includes an upper face 812 and a lower face 813.

The preform section 802 is typically made and then secured to the media pack arrangement 801, for example with an adhesive, to provide a seal therebetween. The preform 802 would typically be molded from a material such as a plastic of appropriate strength and integrity for the application designed. In the example shown, the preform section 802 is an outlet section, and includes a rim piece 840 with an outer lip 841, into which a portion of media pack arrangement 801 is received. The section 802 also includes an outlet arrangement 842, in this instance comprising separate, spaced, outlet members 843, 844. The outlet arrangement 843, 844 typically provided with seal members, for example seal member 847, for securing an engine inlet arrangement, not shown.

Attention is now directed to FIG. 41, a cross-sectional view taken along line 41-41, FIG. 40. Referring to FIG. 41, it can be seen that media pack arrangement 801 is inserted within rim section 840 until the media pack abuts shelf 848. Typically adhesive and sealing arrangement will be provided at that location, permanently securing the media pack 801 to the preform 802, with a seal formed therebetween.

The media pack 801 comprises separate sections 850, 851, each comprising a slanted stack of single spacer strips defining inlet and outlet flutes extending between inlet surfaces at 805a, 805b and outlet surface sections 855a, 855b adjacent outlet face 855. The outlet face 855 includes a central recess 855c therein, defining a v-shaped recess pointing towards opposite face 805 and with an internal angle R as shown. At the inlet face 865, the media pack sections 850, 851 are oriented to provide an apex in face 805, indicated at 805c, defining an outwardly projecting v-section directed away from face 855 having a v-angle S, as shown. Typically angle R would equal 50° to 150° inclusive, typically 80° to 130° inclusive; and angle S would equal 50° to 150° inclusive, typically 80° to 130° inclusive, as with other media packs described herein, although alternatives for each are possible.

The media pack arrangement 850, 851 can be provided in a variety of manners, for example on opposite sides of a center board which can include handle arrangements thereon if desired. However, for the particular example shown, media pack arrangement 850, 851 are adhered directly to one another, for example with an adhesive. In the particular example shown, the media pack sections 850, 851 are secured together along a facing sheet of each, thus leaving corrugated or fluted sheets directed toward top 812 and bottom 813. Of course alternatives are possible. When fluted or corrugated sheets are directed toward top 812 and bottom 813, it may be desirable to provide a protective sheet, such as a kraft paper sheet, secured thereover.

For the example shown in FIGS. 40-42, no screen arrangement is positioned over the media pack 801, although this option is available.

In FIG. 42, a side elevational view of media pack arrangement 801, as it would appear prior to being inserted within preform 802 as shown. Viewable, then, is end piece 810, Opposite end piece 811, FIG. 40, would typically have a mirror image.

Referring to FIG. 41, it is noted that end piece 811 includes a triangular shaped section 811a, projecting beyond end face 855, defining outer edge 811b extending generally perpendicularly to air flow during filtering.

The air cleaner arrangement 800 would be a service part, with both media pack arrangement 801 and preform 802 being replaced or serviced together.

VII. General Observations and Principles

Herein, a variety of features and techniques useable in air cleaners and components therefore are described. There is no specific requirement that all of the techniques be implemented, to obtain some advantage according to the characteristics herein. Certain specific examples have been previously described. Herein, general principles relating to those examples are characterized.

In general, according to the techniques characterized herein, an air filter can be provided which comprises a media pack arrangement including a plurality of flutes extending between an inlet flow face and an outlet flow face. The flutes generally would include a first set of inlet flutes open adjacent the inlet flow face and closed adjacent the outlet flow face; and, a second set of outlet flutes open adjacent the outlet flow face and closed adjacent the inlet flow face. The media pack arrangement would have first and second opposite side ends.

In examples shown, media pack arrangements having a slanted stacked structure are shown incorporated into various media pack arrangements. The arrangements are generally configured with a recess surface at one flow face, and a projection at an opposite flow face, each having a generally v-shape. In selected examples the recess is at either the inlet face or the outlet face; and projection is at either the inlet face or the outlet face. Typically, the internal v-angle of each is within the range of 50°-150°, inclusive, usually 80°-130°, inclusive, although alternatives are possible.

A first side piece, typically molded-in-place, would be secured to a first side end of the media pack arrangement. The first, typically molded-in-place, side piece would have a central apex and end edges on opposite side of the apex, forming a v-shape. There would be provided a second, typically molded-in-place, side piece secured to the second side end of the media pack arrangement. The second, molded-in-place, side piece would typically have an end, with a central apex and end edges on opposite sides of the apex, forming a v-shape. In an example shown, the edge with the central apex is a downstream edge, although alternates are possible.

Certain filter cartridges described herein are for insertion into a housing, and thus would typically include a housing seal arrangement secured, typically molded-in-place, in position extension around the media pack arrangement and the first and second, typically molded-in-place, side pieces.

In certain examples shown, the air filter cartridge would include a first flow face which is non-planar and has a recess region therein, typically a central recess region; and, an optional handle arrangement positioned projecting outwardly from the recess region of the first flow face, in a direction opposite a second flow face. This configuration for the first flow face is provided in the example shown, by a media pack arrangement that includes first and second slanted stacks of strips of single facer media. The first slanted stack of strips of single facer media would be positioned with each strip positioned stepped down in recess, from a next adjacent outer or upper strip to form an inwardly slanted first flow face section and an outwardly slanted opposite second flow face section. Similarly the second slanted stack of strips would be positioned with each strip positioned stepped down from the next adjacent outer or lower strip to form an inwardly slanted first flow face section and an outwardly slanted second flow face section. The first slanted stack of strips will be positioned in the media pack arrangement with the slanted first flow face section of the first slanted stack of strips facing the slanted first flow face section of the second stack of strips; and, with a slanted second flow face section of the first slanted stack of strips directed away from the slanted second flow face section of the second slanted set of strips.

For a specific example shown, the first flow face sections of each slanted stack, are inlet flow face sections; and, the opposite second flow face section of each slanted stack as an outlet flow face section, although alternatives are possible.

Also, although alternatives are possible, for two specific examples shown, the first and second slanted stacks of strips would comprise the same number of strips in the same shape, oriented as mirror images of one another.

In examples provided, each end piece is a molded-in-place end piece which has five edge sections comprising: a top edge; opposite parallel bottom side edge; and, a first, for example front, edge extending between the top and bottom edges in a direction generally perpendicular thereto and perpendicular to a flow direction through the media pack (or a flute extension direction). There is also provided an opposite portion which includes a pair of edges extending at an internal angle with respect to one another and relative to an adjacent one of the top and bottom edges, to form a central apex with opposite sides. Typically the internal angel, in extension around the apex, is within the range of 50° to 150° inclusive. Typically the extension is at an internal angle, relative to the top and bottom edges, within the range of 80° to 130° inclusive. These same angles typically describe the v-shaped recess (internal angle) and the v-shaped projection (internal angle) in the media pack flow faces.

In an example shown, the handle arrangement comprises at least one handle member, typically two spaced handle members, each having a front edge and having a finger aperture arrangement therein. For this example shown, each handle member is positioned with the front edge not projecting outwardly from a plane defined by front or inlet edges of each end piece.

For certain examples shown, a center piece is positioned between the first and second slanted stacks of strips. The center piece includes a center board section positioned between the first and second slanted stack, and first and second spaced handle members projecting from the center board section in a direction outwardly from the recess region of the inlet face in a direction opposite the outlet face of the media pack.

In an example construction described, each slanted stack of strips is positioned with a fluted side thereof directed toward the center piece, and adhered thereto by sealant beads.

In an example provided, an outer screen is secured to the filter cartridge in extension over and upper side surface and opposite lower side surface and the outlet flow face of the media pack arrangement, with no portion of the outer screen extending over the inlet flow face of the media pack arrangement. An example is described in which the outer screen comprises a flexible bi-planar screen.

In an example described, the housing seal arrangement comprises a base section and a compression section, with the compression section being supported on the base section with a receiver space positioned between a portion of the compression section in the media pack arrangement. The compression section in an example shown comprises an outer annular surface portion and an opposite inner surface portion. The outer annular surface portion and inner surface portion in an example shown converge toward one another in extension from a base section toward the downstream tip.

In another characterization, an air filter cartridge comprising a media pack arrangement of two slanted stacks of single facer strips positioned on opposite sides of a center piece is provided with: a first, for example inlet, flow face having a recessed central region; an opposite second, for example outlet, flow face having a central projection; and, the center piece, optionally including a handle arrangement projecting outwardly from the first, for example inlet, flow face. With this arrangement, the housing seal arrangement can be positioned extension around the media pack arrangement adjacent the first face. Various features as previously characterized would be included in such an arrangement.

In an alternate characterization, an air filter cartridge is provided comprising a media pack arrangement including first and second slanted stacks of single facer strips (i.e., strips of fluted media secured to facing media) positioned on opposite sides of a center piece. The first and second slanted stacks each have first and second, opposite, flow faces. The first flow face of the first slanted stack is oriented at an angle toward the first flow face of the second slanted stack, and the first flow face of the second slanted stack is angled toward the first flow face of the first slanted stack; and, the second flow face of the first slanted stack is oriented at an angle away from the second flow face of the second slanted stack, and the second flow face of the second slanted stack is angled away from the second flow face of the first slanted stack. Typically the first slanted stack is an internal acute v-angle BL as described, and, the second slanted stack has a similar internal acute angle. The first and second slanted stacks can have the same number of single facer strips and be oriented as mirror images within the filter cartridge. The center piece can be a flat impermeable section to which the first and second slanted stacks are secured, with the option of including a handle member. Typically the slanted stacks are oriented with fluted sides thereof directed toward the center piece, with a sealant bead therebetween. Also typically molded-in-place end pieces are positioned at opposite ends of the media pack arrangement, typically sealing ends of the single facer strips therein. Typically molded-in-place end pieces would include a first edge extending perpendicularly to a flow direction or flute direction through the media pack arrangement and a second edge opposite the first edge which has a v-shape with a central outwardly projecting apex and opposite side sections. By outwardly projecting, it is meant that the apex projects away from an opposite flow or end face. The second edge of the end pieces would typically have an internal angle, around the apex, as described. The housing seal arrangement would typically be provided in the media pack arrangement, and extension there around. In some arrangements the first flow face would be an inlet flow face of the second flow face an outlet flow face; however, the opposite is possible in some applications.

Also characterized herein are air cleaner assemblies which comprise: a housing having an interior and an inlet section and an outlet section; and, an air filter cartridge operably positioned within the housing interior; the air filter cartridge being as previously characterized. In an example, the inlet section includes a central vane with an apex directed into the outlet section; the inlet face of the media pack includes a recess region therein; and, the apex and the central vane in the inlet section are directed into this central recess of the inlet face of the media pack arrangement.

A housing seal receiver arrangement in the outlet section is described, and an example is provided. Also, a v-shaped receiver for receiving a v-shaped projections on an outlet end of the filter cartridge is described, along with ribs, to facilitate mounting and secure positioning of the filter cartridge, within the assembly.

In another application and principles described herein, an air filter assembly is depicted which comprises a media pack secured permanently to a preform. The media pack includes a flow face (herein first or second) with a projection portion, typically having a v-shape, and, an opposite flow face (herein second or first) with a recess portion, also typically having a v-shape. The media pack arrangements typically comprises two slanted stacks of single facers strips secured to one another. In an example shown, the stacked strips are secured to one another along facing sheets, with fluted sheets projecting oppositely away from each other. Also in an example shown, the end face with a recess therein is an outlet flow face, positioned within the preform; and, flow face having the projection as an opposite inlet flow face, projecting away from the preform. In an example shown, the preform includes an outlet arrangement. The outlet arrangement shown in an example has two outlet members, although alternatives are possible.

In use, the entire assembly comprising the filter cartridge and preform would be a serviceable part, removed for servicing when appropriate for the vehicle involved. It is anticipated that such an arrangement may be useful, for example, in various high performance automobiles.

What is claimed is:

1. An air filter cartridge comprising:
   (a) a media pack arrangement comprising a plurality of flutes extending between an inlet face and an outlet face;
      (i) the flutes including: a first set of inlet flutes open adjacent the inlet face and closed adjacent the outlet face; and, a second set of outlet flutes open adjacent the outlet face and closed adjacent the inlet face;
      (ii) the media pack arrangement having first and second, opposite, side ends;
   (b) a first, molded-in-place, side piece secured to the first side end of the media pack arrangement;
      (i) the first, molded-in-place, side piece having a downstream edge with a central apex and end edges on opposite sides of the apex;
   (c) a second, molded-in-place, side piece secured to the second side end of the media pack arrangement;
      (i) the second, molded-in-place, side piece having a downstream edge with a central apex and end edges on opposite sides of the apex; and,
   (d) a housing seal arrangement secured in position in extension around the media pack arrangement and the first and second molded-in-place side pieces.

2. An air filter cartridge according to claim 1 wherein:
   (a) the inlet face of the media pack arrangement is non-planar and has a recess region therein; and,
   (b) a handle arrangement is positioned projecting outwardly from the recess region of the inlet face.

3. An air filter cartridge according to claim 1 wherein:
   (a) the media pack arrangement includes first and second, slanted, stacks of strips of single facer media;
      (i) the first, slanted, stack of strips of single facer media being positioned with each strip positioned stepped down from a next, adjacent, outer strip to form an inwardly slanted inlet face section and an outwardly slanted outlet face section;
      (ii) the second, slanted, stack of strips of single facer media being positioned with each strip positioned stepped down from a next, adjacent, outer strip to form an inwardly slanted inlet face section and an outwardly slanted outlet face section; and,
      (iii) the first, slanted, stack of strips is positioned within the media pack arrangement: with the slanted inlet face section of the first slanted stack of strips facing the slanted inlet face section of the second slanted stack of strips; and, with the slanted outlet face section of the first slanted stack of strips directed away from the slanted outlet face section of the second slanted stack of strips.

4. An air filter cartridge according to claim 3 wherein:
   (a) the first and second, slanted, stacks of strips each comprise the same number of strips.

5. An air filter cartridge according to claim 3 including:
   (a) a center piece positioned between the first and second, slanted, stacks of strips.

6. An air filter cartridge according to claim 5 wherein:
   (a) the center piece includes: a center board section positioned between the first and second, slanted, stacks, and, first and second, spaced, handle members projecting from the center board section in a direction outwardly from the recess region of the inlet face of the media pack arrangement in a direction opposite the outlet face of the media pack arrangement.

7. An air filter cartridge according to claim 6 wherein:
   (a) the first, slanted, stack has a first side surface comprising facing sheet and a second, opposite, side surface comprising fluted sheet; and,
   (b) the second, slanted, stack has a first side surface comprising facing sheet and a second, opposite, side surface comprising fluted sheet;
   (c) the first, slanted, stack being secured to the center board section, of the center piece, with the second side surface comprising fluted sheet directed toward the center board section and with a first sealant bead therebetween; and, the second slanted stack being secured to the center board section of the center piece, with the second side surface comprising fluted sheet directed toward the center board section with a second sealant bead therebetween.

8. An air filter cartridge according to claim 1 wherein:
(a) each molded-in-place side piece has five (5) edge sections comprising: a top edge; an opposite, parallel, bottom side edge; a front edge extending between the top and bottom edges in a direction perpendicular thereto; and, a pair of rear edges each extending at an internal angle within the range of 50° to 150°, inclusive, relative to an adjacent one of the top and bottom edges, to form the end edges on opposite sides of the central apex of the associated one of the molded-in-place side pieces.

9. An air filter cartridge according to claim 8 including:
(a) a handle arrangement that includes at least one handle member having a front edge and having finger aperture arrangement therein;
  (i) the at least one handle member being positioned with the front edge not projecting outwardly from the front edge of each molded-in-place side piece.

10. An air filter cartridge according to claim 1 including:
(a) an outer screen secured to the filter cartridge in extension over: an upper side surface; an opposite lower side surface; and, the outlet face of the media pack arrangement;
  (i) the outer screen not extending over the inlet face of the media pack arrangement.

11. An air filter cartridge according to claim 10 wherein:
(a) the outer screen comprises a flexible, bi-planar, screen.

12. An air filter cartridge according to claim 1 wherein:
(a) the housing seal arrangement comprises a base section and a compression section;
  (i) the compression section being supported on the base section with a receiver space positioned between a portion of the compression section and the media pack arrangement.

13. An air filter cartridge according to claim 12 wherein:
(a) the compression section of the housing seal arrangement includes: a downstream tip; an outer, annular, surface portion; and, an opposite inner surface portion; the outer, annular, surface portion and the inner surface portion converging toward one another in extension toward the downstream tip.

14. An air filter cartridge according to claim 13 wherein:
(a) an angle of convergence between the outer, annular, surface portion and the inner surface portion is within the range of 5° to 8°, inclusive.

15. An air cleaner assembly comprising:
(a) a housing having an interior and comprising an inlet section and an outlet section; and
(b) an air filter cartridge according to claim 1 operable positioned within the housing interior.

16. An air cleaner assembly according to claim 15 wherein:
(a) the inlet section of the housing includes a central vane with an apex directed into the outlet section;
(b) the inlet face of the media pack arrangement includes a recess region therein; and,
(c) the filter cartridge is positioned with the apex of the central vane of the inlet section directed into the central recess region of a face of the media pack arrangement.

17. An air cleaner assembly according to claim 15 wherein:
(a) the outlet section of the housing includes a seal receiver arrangement having an inner wall projection, an outer wall projection and a central seal projection; and,
(b) the filter cartridge includes a housing seal arrangement comprising a base section and a compression section; the base section supporting the compression section with a portion of the compression section spaced from the media pack arrangement forming a receiver space;
(c) the filter cartridge being positioned with:
  (i) the inner wall projection of the seal receiver arrangement projecting into the receiver space between a portion of the compression section and the media pack arrangement; and,
  (ii) the compression section of the housing seal arrangement compressed between the housing inlet and outlet sections, with the central seal projection pressed into the compression section.

18. An air cleaner assembly according to claim 15 wherein:
(a) the housing outlet section includes opposite side walls;
  (i) each side wall including a v-shaped end receiver with a central apex projecting downstream;
(b) the filter cartridge includes molded-in-place side pieces, each having an edge with a central apex;
  (i) the filter cartridge being positioned in the housing with the edge of each molded-in-place side piece having a central apex directed into an inside of an associated one of the v-shaped end receivers.

19. An air filter cartridge comprising:
(a) a media pack arrangement comprising two slanted stacks of single facer strips positioned on opposite sides of a center piece and defining:
  (i) an inlet face with a recessed central region; and,
  (ii) an outlet face with a central projection;
  (iii) the center piece including a handle arrangement projecting outwardly from the inlet face; and,
(b) a housing seal arrangement positioned in extension around the media pack arrangement adjacent the upstream face.

20. An air filter cartridge according to claim 19 including:
(a) first and second, opposite, side end pieces, molded-in-place on opposite side ends of the media pack arrangement;
  (i) the housing seal arrangement extending over the first and second side end pieces.

21. An air filter cartridge comprising:
(a) a media pack arrangement comprising strips of single facer media and first and second, opposite, flow faces;
  (i) the first flow face having a central recess therein formed by strips of single facer media forming a face having an inwardly directed v-shape; and,
  (ii) the second flow face having a central projection therein formed by strips of single facer media forming a face having an outwardly directed v-shape.

22. An air filter cartridge according to claim 21 wherein:
(a) the media pack arrangement comprises first and second slanted stacks of single facer strips;
  (i) the first and second slanted stacks each having first and second, opposite, flow faces;
    (A) the first flow face of the first slanted stack being oriented angled toward the first flow face of the second slanted stack; and,
    (B) the second flow face of the first slanted stack being oriented angled away from the second flow face of the second slanted stack.

23. An air filter cartridge according to claim 22 wherein:
(a) the first and second slanted stacks are positioned on opposite sides of a center piece.

24. An air filter cartridge according to claim 22 wherein:
(a) the first and second stacks have a same number of single spacer strips and are positioned within the air filter cartridge as mirror images of one another.

25. An air filter cartridge according to claim 23 wherein:
(a) the center piece includes a flat, impermeable, section to which the first and second slanted stacks are secured.

26. An air filter cartridge according to claim 23 wherein:
(a) the first slanted stack includes a fluted side;
(b) the second slanted stack includes a fluted side; and,
(c) the first and second slanted stacks are secured to the centerpiece with a fluted side of each adjacent the centerpiece.

27. An air filter cartridge according to claim 21 wherein:
(a) the first flow face has an internal v-angle within the range of 50° to 150° inclusive; and,
(b) the second flow face has an internal v-angle within the range of 50° to 150° inclusive.

28. An air filter cartridge according to claim 21 including:
(a) first and second molded-in-place end pieces secured to opposite side ends of the media pack arrangement.

29. An air filter cartridge according to claim 28 wherein:
(a) each molded-in-place end piece includes a first edge extending perpendicularly to a flow direction through the media pack arrangement; and, a second edge, opposite the first edge, having a v-shape with a central, outwardly projecting, apex and opposite side sections;
(i) the second edge of the end pieces having an internal angle within the range of 50° to 150°, inclusive.

30. An air filter cartridge according to claim 21 wherein:
(a) the media pack arrangement includes a housing seal arrangement thereon.

31. An air filter cartridge according to claim 21 wherein:
(a) the first flow face is an inlet flow face; and,
(b) the second flow face is an outlet flow face.

32. An air filter cartridge according to claim 21 wherein:
(a) the second flow face is an inlet flow face; and,
(b) the first flow face is an outlet flow face.

33. An air cleaner assembly comprising:
(a) a media pack arrangement including stacked strips of single facer media and having first and second, opposite, flow faces;
(i) the first flow face having a v-shaped recess therein; and,
(ii) the second flow face having a v-shaped projection thereon;
(b) a preform arrangement adhesively secured to the media pack arrangement;
(i) the preform including a flow outlet.

34. An air cleaner assembly according to claim 33 wherein:
(a) the preform includes a rim section circumscribing the media pack arrangement.

35. An air cleaner assembly according to claim 34 wherein:
(a) the flow outlet arrangement in the preform includes two spaced outlet members.

36. An air cleaner assembly according to claim 33 wherein:
(a) the first flow face is an outlet flow face; and
(b) the second flow face is an inlet flow face.

37. An air cleaner assembly according to claim 33 wherein:
(a) the media pack arrangement includes molded-in-place end pieces on opposite ends thereof.

38. An air filter cartridge comprising:
(a) a media pack arrangement comprising a plurality of flutes extending between an inlet face and an outlet face;
(i) the flutes including: a first set of inlet flutes open adjacent the inlet face and closed adjacent the outlet face; and, a second set of outlet flutes open adjacent the outlet face and closed adjacent the inlet face;
(ii) the media pack arrangement having first and second, opposite, side ends;
(b) a first, molded-in-place, side piece secured to the first side end of the media pack arrangement;
(i) the first, molded-in-place, side piece having an edge with a central apex and end edges on opposite sides of the apex;
(c) a second, molded-in-place, side piece secured to the second side end of the media pack arrangement;
(i) the second, molded-in-place, side piece having an edge with a central apex and end edges on opposite sides of the apex; and,
(d) a housing seal arrangement secured in position in extension around the media pack arrangement and the first and second molded-in-place side pieces.

39. An air filter cartridge comprising:
(a) a media pack arrangement comprising two slanted stacks of single facer strips positioned on opposite sides of a center piece and defining:
(i) a first flow face with a recessed central region; and,
(ii) a second flow face with a central projection;
(iii) the center piece including a handle arrangement projecting outwardly from the first face; and,
(b) a housing seal arrangement positioned in extension around the media pack arrangement adjacent the first face.

* * * * *